US009712491B2

(12) United States Patent
Burns et al.

(10) Patent No.: US 9,712,491 B2
(45) Date of Patent: Jul. 18, 2017

(54) ACCESS CONTROL LISTS FOR PRIVATE NETWORKS OF SYSTEM AGNOSTIC CONNECTED DEVICES

(71) Applicant: Qualcomm Connected Experiences, Inc., San Diego, CA (US)

(72) Inventors: Gregory Burns, Seattle, WA (US); Joshua Dickenson Hershberg, Beit Shemesh (IL); Phil Tien Nguyen, San Diego, CA (US); Fruma Adina Geffen, Beit Shemesh (IL)

(73) Assignee: QUALCOMM CONNECTED EXPERIENCES, INC., San Diego, CA (US)

( * ) Notice: Subject to any disclaimer, the term of this patent is extended or adjusted under 35 U.S.C. 154(b) by 0 days.

(21) Appl. No.: 14/636,955

(22) Filed: Mar. 3, 2015

(65) Prior Publication Data
US 2015/0249642 A1    Sep. 3, 2015

Related U.S. Application Data

(60) Provisional application No. 61/947,408, filed on Mar. 3, 2014, provisional application No. 62/026,024, filed on Jul. 17, 2014.

(51) Int. Cl.
*H04L 29/06* (2006.01)
*H04L 12/66* (2006.01)
(Continued)

(52) U.S. Cl.
CPC ........ *H04L 63/0272* (2013.01); *G06F 21/629* (2013.01); *H04L 12/6418* (2013.01);
(Continued)

(58) Field of Classification Search
CPC .......... G06F 8/61; G06F 21/30; G06F 21/629; H04L 12/6418; H04L 12/66; H04L 63/20;
(Continued)

(56) References Cited

U.S. PATENT DOCUMENTS 8,086,495 B2 * 12/2011 Ansari ............... G06Q 30/0601
705/26.1
8,583,728 B2 * 11/2013 Irwin .................... G06F 19/322
709/203
(Continued)

FOREIGN PATENT DOCUMENTS

CN       101330714 A  * 12/2008
NO    2016093723 A1     6/2016

OTHER PUBLICATIONS

"Part 15.4: Low-Rate Wireless Personal Area Networks (LR-WPANs)", IEEE Computer Society, IEEE Std 802.15.4e-2012, Apr. 16, 2012, 225 pages.*
(Continued)

*Primary Examiner* — Roderick Tolentino
*Assistant Examiner* — Walter Malinowski
(74) *Attorney, Agent, or Firm* — Neugeboren O'Dowd PC

(57) ABSTRACT

The disclosure relates to using a control service to control external access to APIs of IoT devices on a private network. An external application can request access to an API, and in response, the control service can monitor broadcasts from the IoT devices indicating what APIs they have available. If a match exists, the control service can request user authorization to allow the requested access. The user can grant or deny the requested access, and place limitations on the authorized access. The control service uses this information to open a connection between the requesting application and the IoT device having the requested API, and via this
(Continued)

connection, the requesting application can access and control the device running the requested API.

14 Claims, 23 Drawing Sheets

(51) Int. Cl.
*H04L 29/08* (2006.01)
*H04L 12/64* (2006.01)
*G06F 21/62* (2013.01)
*G06F 9/445* (2006.01)
*H04W 84/22* (2009.01)

(52) U.S. Cl.
CPC ............ *H04L 12/66* (2013.01); *H04L 63/101* (2013.01); *H04L 67/12* (2013.01); *G06F 8/61* (2013.01); *G06F 2221/2141* (2013.01); *H04L 63/108* (2013.01); *H04W 84/22* (2013.01)

(58) Field of Classification Search
CPC ............... H04L 63/101; H04L 63/0209; H04L 63/0272; H04L 63/10; H04L 63/08; H04L 67/12
USPC ...................... 726/2, 3, 4; 709/223, 224, 225
See application file for complete search history.

(56) References Cited

U.S. PATENT DOCUMENTS

| | | | | |
|---|---|---|---|---|
| 8,595,489 B1* | 11/2013 | Faaborg | ................ | H04W 12/02 713/166 |
| 8,892,679 B1* | 11/2014 | Destagnol | .............. | G06Q 10/10 709/203 |
| 8,935,755 B1* | 1/2015 | Kay | ........................... | G06F 8/61 726/1 |
| 2003/0115344 A1* | 6/2003 | Tang | ................... | H04L 63/0272 709/229 |
| 2004/0054718 A1* | 3/2004 | Hicks, III | ............. | H04L 69/329 709/203 |
| 2004/0078591 A1* | 4/2004 | Teixeira | ................ | G06F 21/554 726/4 |
| 2004/0205766 A1* | 10/2004 | Lee | ......................... | H04L 67/20 719/311 |
| 2005/0022015 A1* | 1/2005 | Van Den Heuvel | .... | G06F 21/10 726/4 |
| 2006/0193323 A1* | 8/2006 | Lee | ................... | H04L 29/06027 370/392 |
| 2007/0074286 A1* | 3/2007 | Wendling | ................... | G06F 8/34 726/21 |
| 2007/0226258 A1* | 9/2007 | Lambdin | ............ | G02B 23/2469 |
| 2009/0138444 A1* | 5/2009 | Kim | ....................... | H04W 4/006 |
| 2009/0257416 A1* | 10/2009 | Walker | .................... | H04W 8/20 370/338 |
| 2009/0259515 A1* | 10/2009 | Belimpasakis | ........ | G06Q 30/02 709/218 |
| 2009/0319677 A1* | 12/2009 | Masermann | ........... | G06Q 10/08 709/229 |
| 2010/0217837 A1* | 8/2010 | Ansari | .................... | G06Q 30/04 709/218 |
| 2011/0106279 A1* | 5/2011 | Cho | ........................ | G08C 17/02 700/90 |
| 2011/0289134 A1* | 11/2011 | de los Reyes | .......... | H04L 63/20 709/203 |
| 2011/0299550 A1* | 12/2011 | Karaoguz | ............... | G06Q 20/10 370/401 |
| 2012/0116820 A1* | 5/2012 | English | .................. | G06Q 40/08 705/4 |
| 2012/0291103 A1* | 11/2012 | Cohen | ................... | G06F 21/629 726/4 |
| 2012/0317609 A1* | 12/2012 | Carrara | ............... | G06F 21/6218 726/1 |
| 2013/0041997 A1* | 2/2013 | Li | ........................... | H04L 67/12 709/223 |
| 2013/0080898 A1* | 3/2013 | Lavian | ..................... | G06F 3/01 715/728 |
| 2013/0174211 A1* | 7/2013 | Aad | ........................ | G06F 21/604 726/1 |
| 2013/0205019 A1* | 8/2013 | Oellermann | ........ | H04L 41/5038 709/224 |
| 2014/0019717 A1* | 1/2014 | Yamashita | ................ | G06F 9/52 712/42 |
| 2014/0032691 A1* | 1/2014 | Barton | .................... | H04L 41/00 709/206 |
| 2014/0036881 A1* | 2/2014 | Kim | ........................ | H04L 5/001 370/336 |
| 2014/0097669 A1* | 4/2014 | Nagashima | ......... | H02M 1/4225 307/9.1 |
| 2014/0132702 A1* | 5/2014 | Leibovich | .............. | H04N 7/157 348/14.08 |
| 2014/0208393 A1* | 7/2014 | Yasukawa | ......... | H04L 29/12509 726/4 |
| 2014/0244834 A1* | 8/2014 | Guedalia | .................. | H04L 67/16 709/224 |
| 2014/0258363 A1* | 9/2014 | Peco | ....................... | H04L 51/32 709/202 |
| 2014/0259096 A1* | 9/2014 | Biswas | .................. | H04W 12/02 726/1 |
| 2014/0289366 A1 | 9/2014 | Choi et al. | | |
| 2014/0359131 A1* | 12/2014 | Seed | ...................... | H04L 47/125 709/226 |
| 2015/0019714 A1* | 1/2015 | Shaashua | ................ | H04L 67/24 709/224 |
| 2015/0026779 A1 | 1/2015 | Ilsar et al. | | |
| 2015/0113599 A1* | 4/2015 | Curtis | ................. | H04L 63/0428 726/4 |
| 2015/0134954 A1* | 5/2015 | Walley | .................... | H04L 63/08 713/168 |
| 2015/0142963 A1* | 5/2015 | Choi | ....................... | H04L 67/12 709/224 |
| 2015/0222517 A1 | 8/2015 | Mclaughlin et al. | | |
| 2015/0249672 A1 | 9/2015 | Burns et al. | | |
| 2015/0281246 A1* | 10/2015 | Lewis | .................... | H04L 63/101 726/4 |
| 2015/0365460 A1* | 12/2015 | Miller | ..................... | H04L 67/02 709/203 |
| 2016/0057107 A1* | 2/2016 | Call | ...................... | H04L 63/101 726/11 |
| 2016/0173450 A1* | 6/2016 | Mircescu | ................ | H04L 67/12 726/14 |

OTHER PUBLICATIONS

Leahy, "A lightweight protocol for constrained devices for use in the Internet of Things paradigm", University of Glasgow, Mar. 22, 2013, 62 pages.*

Lloret, "Ubiquitous Monitoring of Electrical Household Appliances", Sensors 2012, ISSN 1424-8220, 33 pages.*

Yamazaki, "Distributed and Cooperative Service Platforms for Home Network Services", NiCT, Journal of the National Institute of Information and Communications Technology, vol. 54, No. 3, 2007, pp. 155-164.*

Jordan, "Should Users be entitled to use and control the devices of their choice on networks?", 978-1-4673-0269-2, 2012, IEEE, pp. 1036-1041.*

Stajano, "The Thinnest of Clients: Controlling It All via Cellphone", Mobile Computing and Communications Review, vol. 2, No. 4, 1998, pp. 46-53.*

Leahy., "A Lightweight Protocol for Constrained Devices for Use in the Internet of Things paradigm", University of Glasgow, Mar. 22, 2013, 62 pages.

Lloret J., et al., "Ubiquitous Monitoring of Electrical Household Appliances," Sensors, 2012, vol. 12, pp. 15159-15191.

"Part 15.4: Low-Rate Wireless Personal Area Networks (LR-WPANs)", IEEE Computer Society, IEEE Std 302.15.4e-2012, Apr. 16, 2012, 225 pages.

(56) References Cited

OTHER PUBLICATIONS

Yamazaki., "Distributed and Cooperative Service Platforms for Home Network Services", NICT, Journal of the National Institute of Information and Communications Technology, vol. 54, No. 3, 2007, pp. 155-164.

Neto, M., et al.,"AoT: Authentication and Access Control for the Entire IoT Device Life-Cycle", Sensys, Nov. 4-16, 2016, pp. 1-15.

* cited by examiner

ACCESS CONTROL LISTS FOR PRIVATE NETWORKS OF SYSTEM AGNOSTIC CONNECTED DEVICES

CROSS REFERENCE TO RELATED APPLICATIONS

The present Application for Patent claims priority to Provisional Application No. 61/947,408 entitled "ACCESS CONTROL LISTS FOR PRIVATE NETWORKS OF SYSTEM AGNOSTIC CONNECTED DEVICES" filed Mar. 3, 2014, and Provisional Application No. 62/026,024, entitled "ACCESS CONTROL LISTS FOR PRIVATE NETWORKS OF SYSTEM AGNOSTIC CONNECTED DEVICES" filed Jul. 17, 2014. Both applications are assigned to the assignee hereof and hereby expressly incorporated by reference herein.

TECHNICAL FIELD

Various embodiments described herein generally relate to providing user-controlled access to APIs of networked devices over a private Wi-Fi network or other private network.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

Accordingly, in the near future, increasing development in IoT technologies will lead to numerous IoT devices surrounding a user at home, in vehicles, at work, and many other locations. As more and more devices become network-aware, the threat of nefarious access to such devices and to private networks comprising these devices will grow. The IoT makes the functionality of devices within a home accessible from outside the home (and outside a private network). This creates security and privacy implications for users who on the one hand want the convenience of being able to raise the thermostat on the heating system when heading home, access a security camera from work, or check on gas/water leaks while on vacation, but do not want an attacker to be able to do the same. This is because each IoT device presents an access point to the network for nefarious users, and thus each new device creates a further potential chink in a secure network's armor.

Existing systems for interconnecting IoT devices to the Internet require IoT devices and a gateway that are pre-configured for connection to each other. If an IoT device is added to a home that is not pre-configured to talk to the gateway (e.g., adding a WeMo light switch to a typical Wi-Fi enabled home network), then the IoT device will not be able to participate in the private network without manual configuration. While manual configuration may be possible for sophisticated users (and a different configuration may be required for each device having a different manufacturer), as the number of IoT devices in a home or business increases, the burden and complexity of manually adding all these devices to the private network may become overly burdensome if not impossible.

Thus, there is a need for secure systems and methods to allow restricted access to IoT devices from the public Internet or other public networks, and further to enable system-agnostic IoT devices to join and leave a private network without manual configuration of network settings for each device.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to one exemplary aspect, a system is provided wherein IoT devices are exposed to a public network such as the Internet by exposing APIs of IoT devices rather than IP addresses and port numbers. This enables a private network to be established between IoT devices and a gateway device (e.g., a PC, router, modem, IoT device, to name a few) without manual configuration of network settings for each IoT device. In other words, system-agnostic IoT devices can be added to the private network seamlessly and without user configuration. Further, the system prevents nefarious access to IoT devices by first determining what APIs are requested by applications on the public network and then requesting authorization for such access from a user. As such, no access to the private network and its IoT devices occurs unless explicitly authorized by a user.

More particularly, a control service acting as a point of entry to a private network through which all external access from the Internet must pass, can include an access list stored in a memory associated with the control service that limits external access to specific APIs within the private network. In other words, unlike a typical firewall that limits access to certain devices within a private network, the control service limits access to certain APIs of IoT devices. This is particularly useful in a home or business network comprising various IoT devices such as lights and thermostats since a head of a household or office manager may wish to have complete access and control over all IoT devices in a home while providing limited or time sensitive access to other persons such as children or service staff. Applications and devices on the public network can request permission to access or control one or more APIs within the private network via the control service. If such requested APIs are provided by at least one IoT device on the private network, then the control service can prompt a user (e.g., an administrator of the private network) to grant or deny the requested access. The authorization, or lack thereof, and any qualifications on the same (e.g., a time period for access), are recorded in the access control list, and the control service then creates a hole or pathway between the requesting application or device requesting API access, and the requested API, thereby exposing the API to the requesting application or device. The requesting device or application can then make calls to the API in order to collect data from or exert control over the IoT device. However, this limited API access does not give the requesting device or application full control over the IoT device, nor give it control over any other IoT devices. Also, because devices within the private network are often added to and removed from the private network (e.g., when a networked light bulb is turned off or a networked thermostat is installed) the access control list is often changing and the control service is responsible for updating the access control list.

One aspect of the disclosure includes a system for securing access to internet-of-things (IoT) devices on a private network. The system can include an IoT device, a gateway device, one or more IoT services on the gateway device, a control service on the gateway device, and a configuration module. The IoT device on the private network can have one or more APIs. The gateway device can be coupled to the private network and can be coupled to a public network, and can be configured to receive API requests over the public network. The one or more IoT services on the gateway device can be for managing the API requests. The control service on the gateway device can be for matching one of the one or more APIs on the IoT device with the one or more APIs requested by the IoT service. The configuration module can be configured to prompt a user to allow the one or more IoT services to have access to the one of the one or more APIs on the IoT device, and upon authorization from the user, allowing authorized IoT services to access the API.

Another aspect of the disclosure includes a method for securing access to internet-of-things (IoT) devices on a private network. The method can include precluding access to a private network. The method can further include receiving a request to access an API on the private network from an IoT service on a public network. The method can further include determining matches between the API requested by the IoT service and available APIs on IoT devices on the private network. The method can yet further include prompting a user to allow the IoT service to have access to the APIs on the IoT devices that are the same as the API requested by the IoT service and upon receiving authorization from the user, allowing the IoT service to access the APIs.

Yet another aspect of the disclose includes a system for securing access to internet-of-things (IoT) devices on a private network. The system can include means for precluding access to a private network. The system can also include means for receiving a request to access an API on the private network from an IoT service on a public network. The system can further include means for determining matches between the API requested by the IoT service and available APIs on IoT devices on the private network. The system can yet further include means for prompting a user to allow the IoT service to have access to the APIs on the IoT devices that are the same as the API requested by the IoT service and upon receiving authorization from the user, allowing the IoT service to access the APIs.

Yet another aspect of the disclosure relates to a system including a gateway device, one or more IoT devices, an app download server, a manifest file, and an app connectivity service. The gateway device can be coupled to a public and to a private network and can be for precluding access from the public network to the private network. The one or more IoT devices can be on the private network. The app download server can include a third-party app for requesting download to the gateway device. The third-party app can also be for requesting access to at least one function of an IoT device on the private network regardless as to the IoT device on which the function operations. The app connectivity service can be configured to record the at least one function requested by the third-party app to the manifest file. It can also be configured to identify available functions on the one or more IoT devices that match the at least one function requested by the third-party app. The app connectivity service can be further configures to record in the manifest file a mapping between those of the available functions that match the at least one function requested by the third-party app, one or more IoT devices hosting those of the available functions, and the third-party app. The app connectivity service can yet further be configured to prompt a user to allow the third-party app to have access to the available functions that match the at least one function requested by the third-party app. It can also be configured to, upon receiving authorization from the user, download and install the third-party app on the gateway device and allow the third-party app to access the available functions on the one or more IoT devices authorized by the user.

Another aspect of the disclosure relates to a method of controlling access to IoT devices selectively isolated from a public network by a gateway device. The method can include compiling a list of available APIs on IoT devices that are on a private network. The method can also include receiving a request from a third-party app to access a requested function regardless of an IoT device on the private network having the requested function. The method can further include identifying matches between the requested function and the available APIs in the list of available APIs that provide the requested function. The method can yet further include prompting a user to allow the third-party app to access the available APIs that provide the requested function. The method can also include upon receiving authorization from the user, downloading and installing the third-party app on a device having access to the private network. The method also can include enabling the third-party app, once installed, to have access to those ones of the available APIs authorized by the user.

Yet another aspect of the disclosure is a system for controlling access to IoT devices selectively isolated from a public network by a gateway device. The system can include means for compiling a list of available APIs on IoT devices that are on a private network. The system can also include means for receiving a request from a third-party app to access a requested function regardless of an IoT device on the private network having the requested function. The system can yet further include means for identifying matches between the requested function and the available APIs in the list of available APIs that provide the requested function. The system can additionally include means for prompting a user to allow the third-party app to access the available APIs that provide the requested function. The system also can include means for upon receiving authorization from the user, downloading and installing the third-party app on a device having access to the private network. The system can yet further include means for enabling the third-party app, once installed, to have access to those ones of the available APIs authorized by the user.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
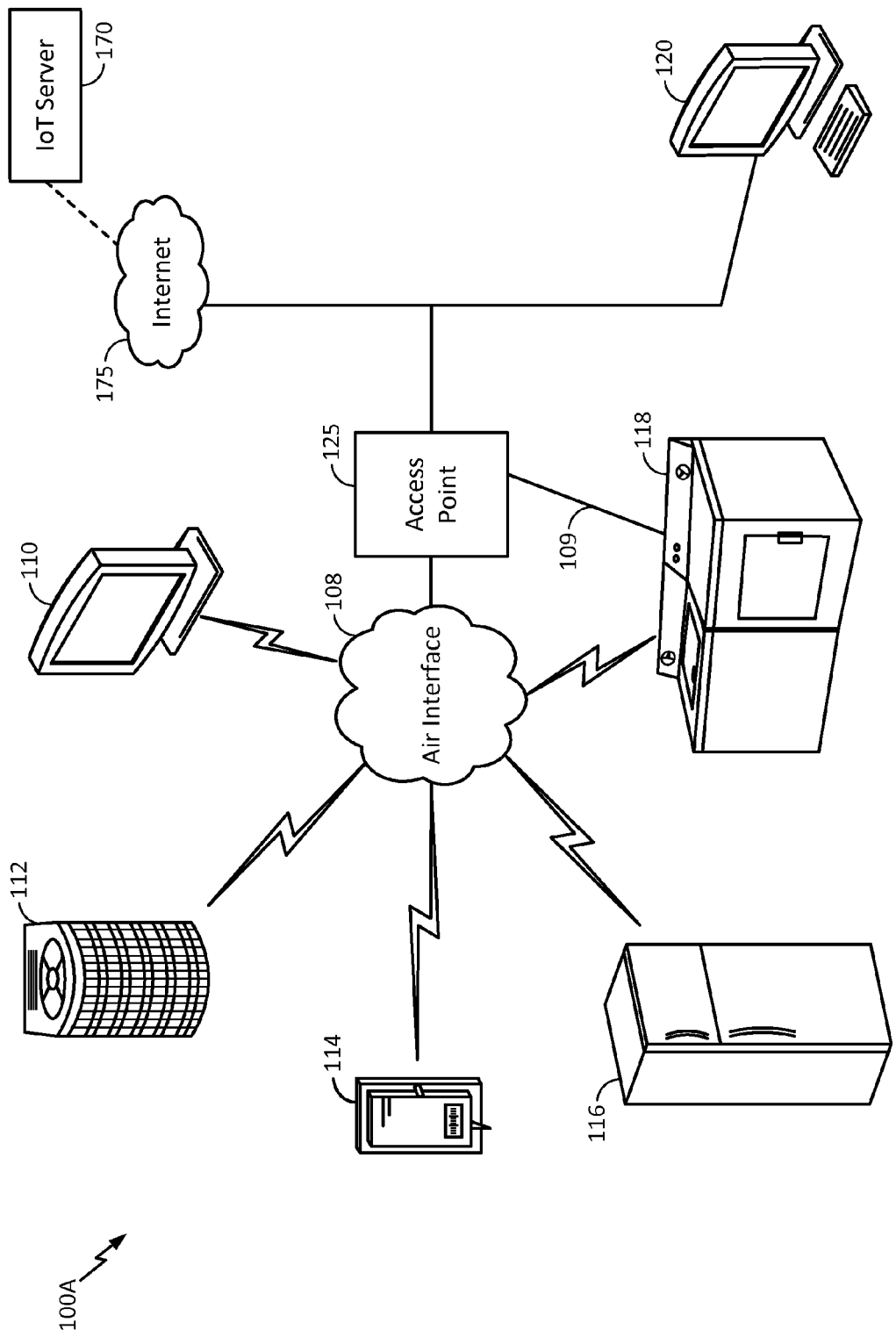
FIG. 1A illustrates a high-level system architecture of a wireless communications system in accordance with an aspect of the disclosure.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
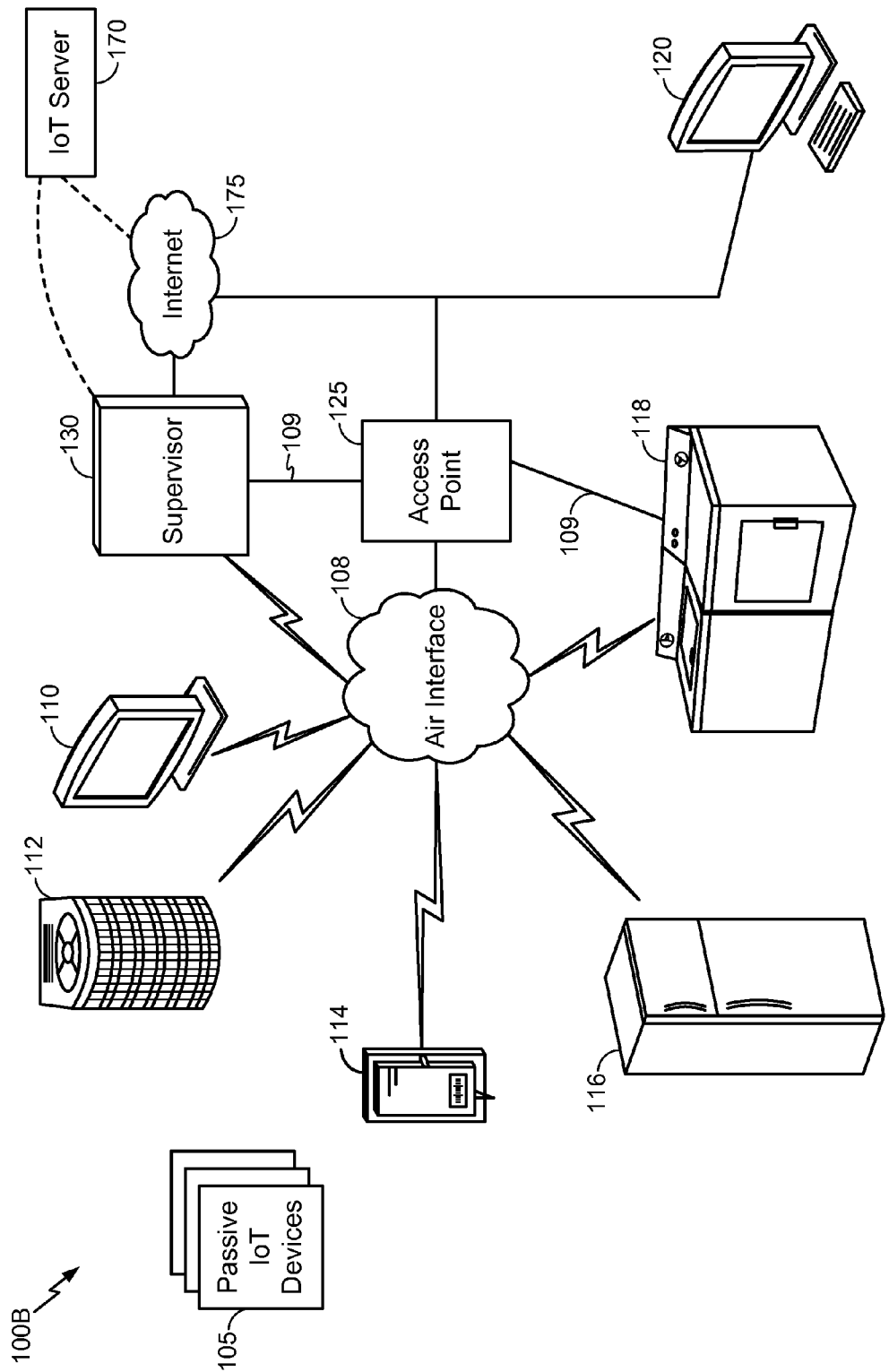
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
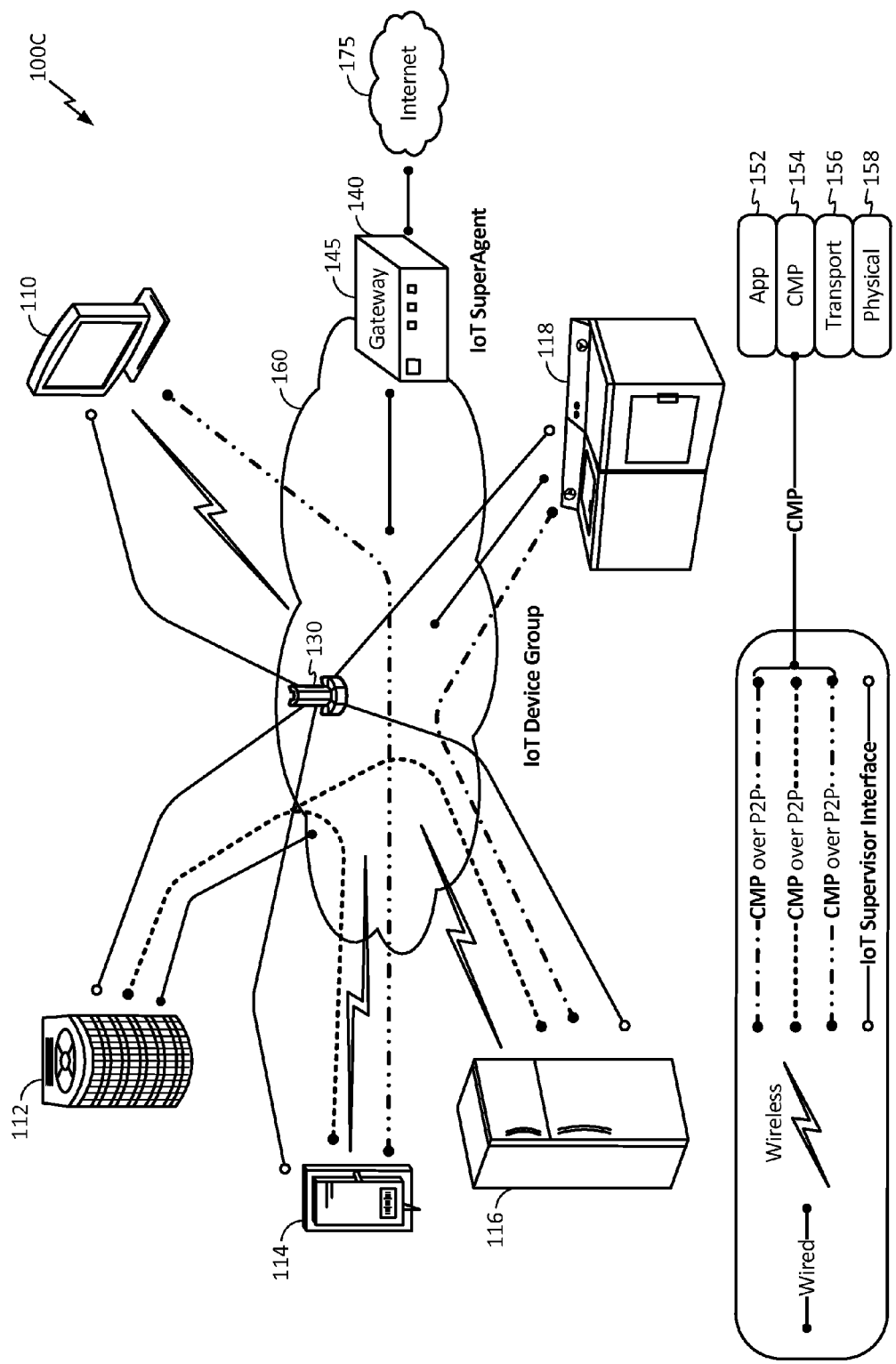
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
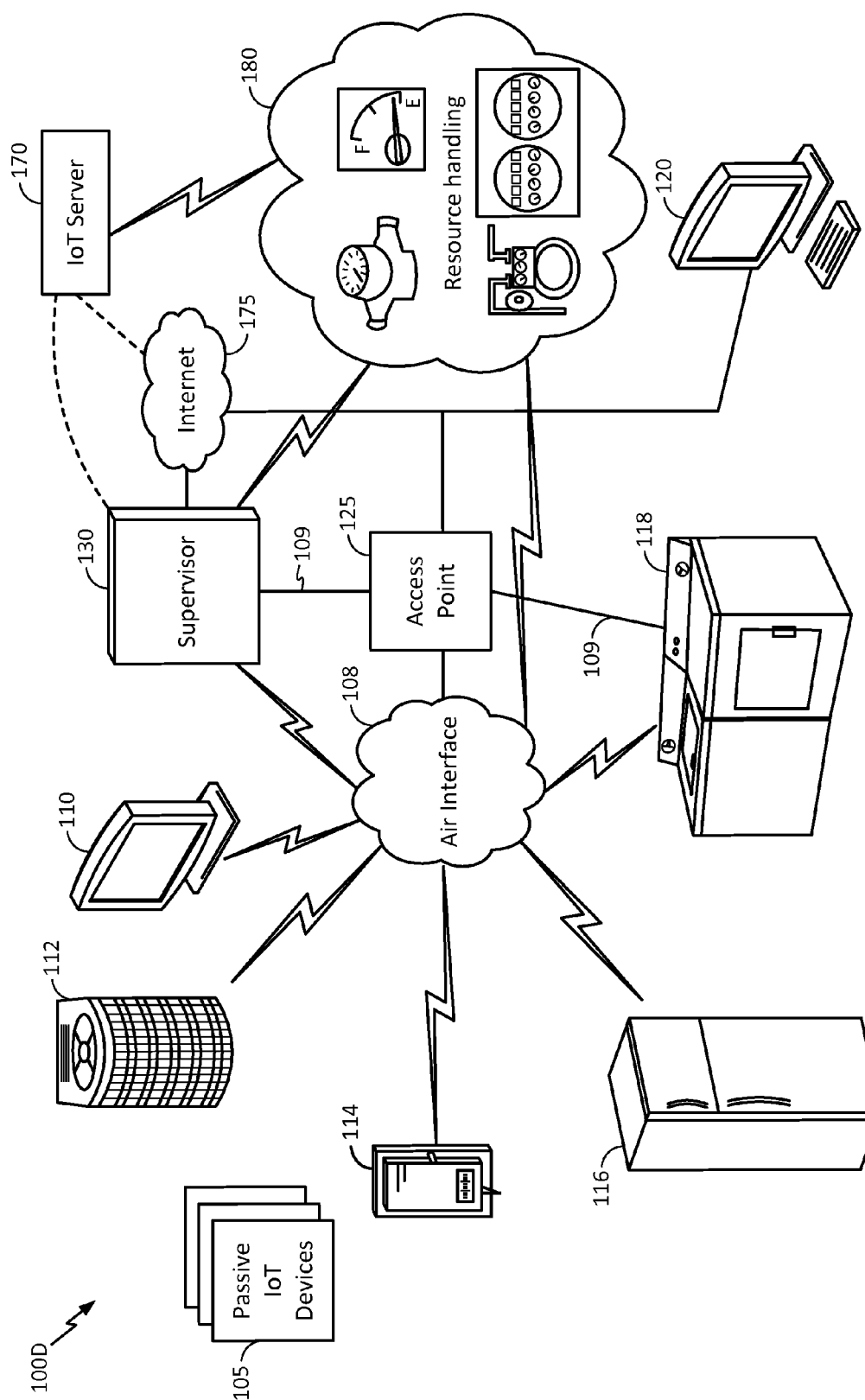
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
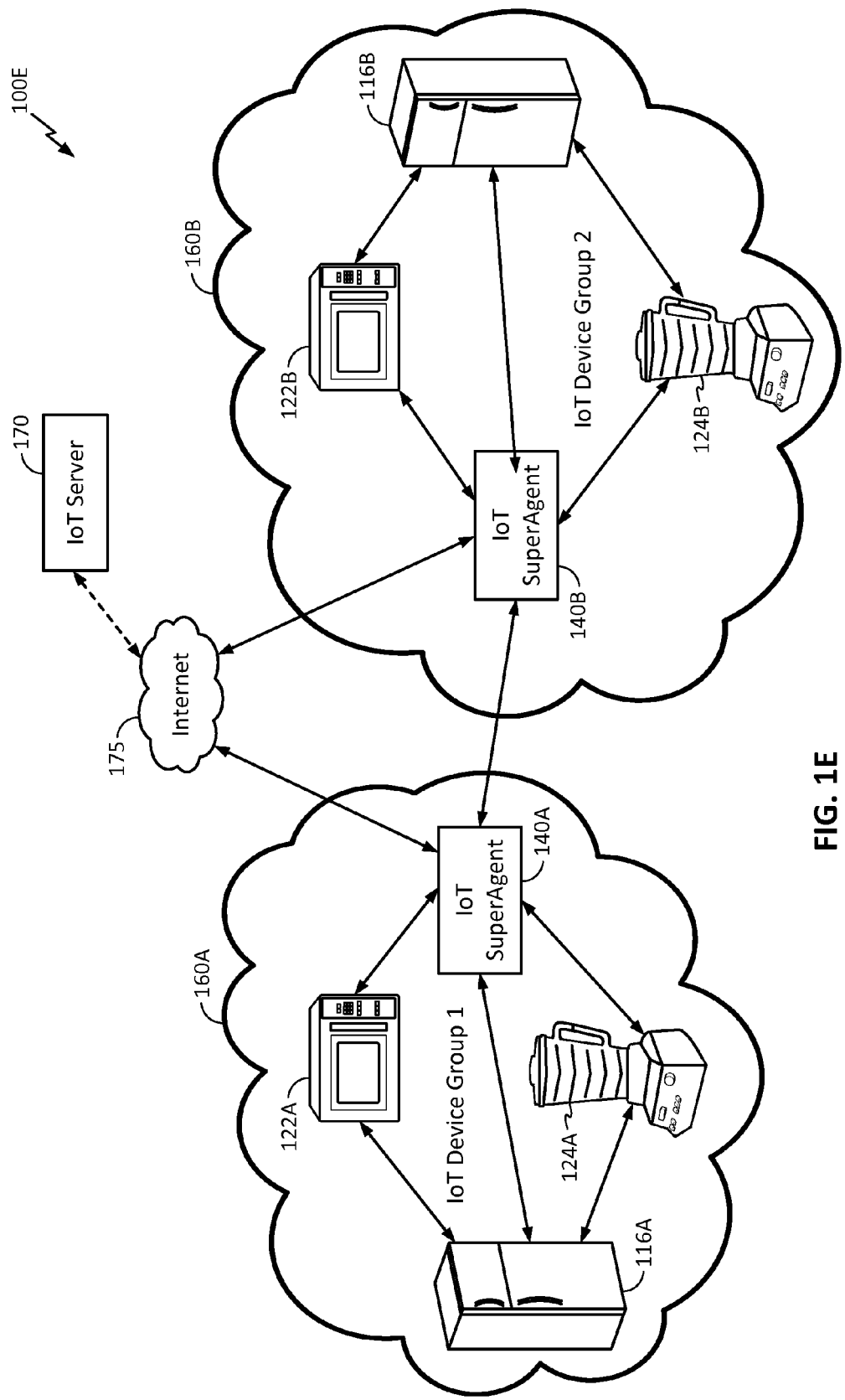
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
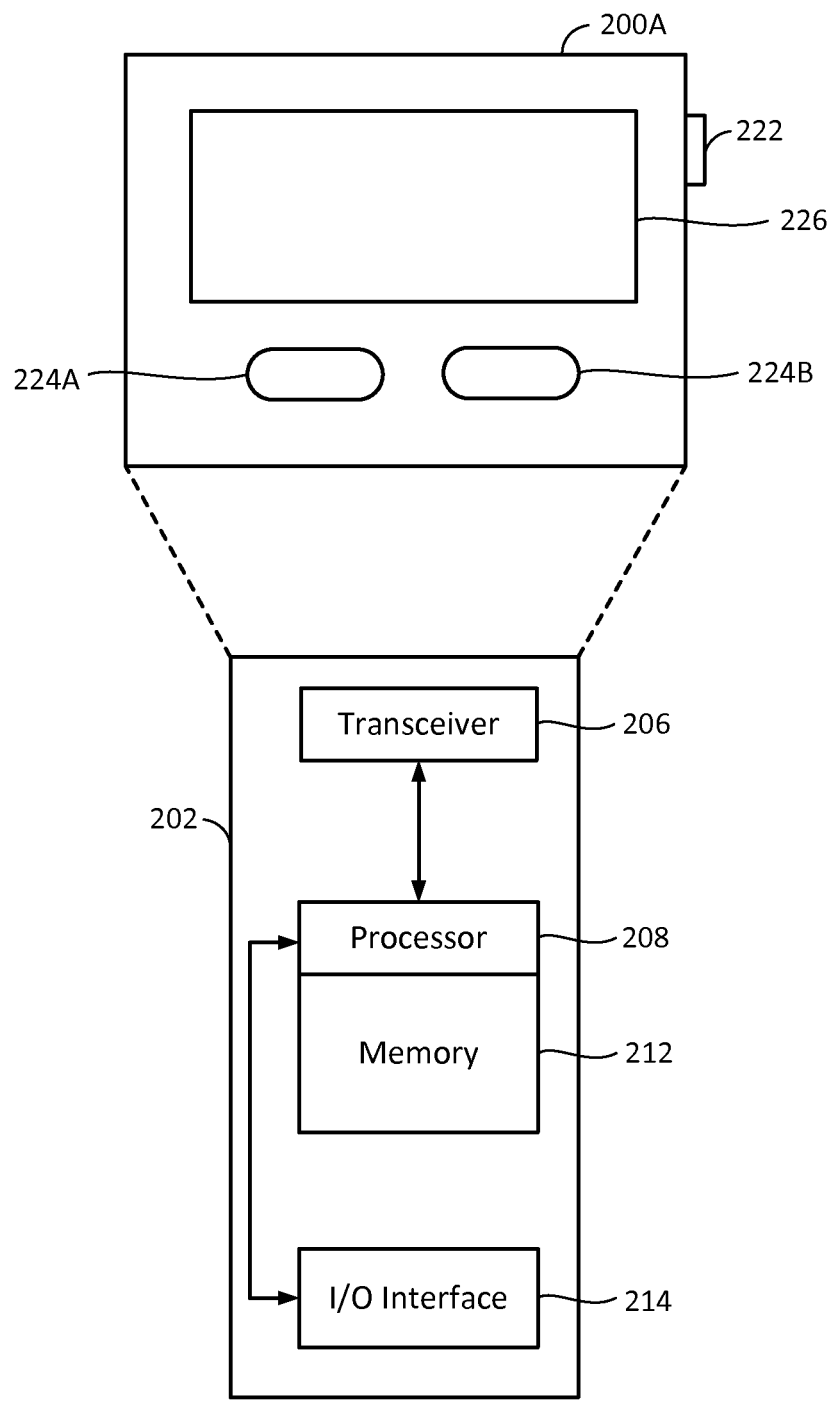

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
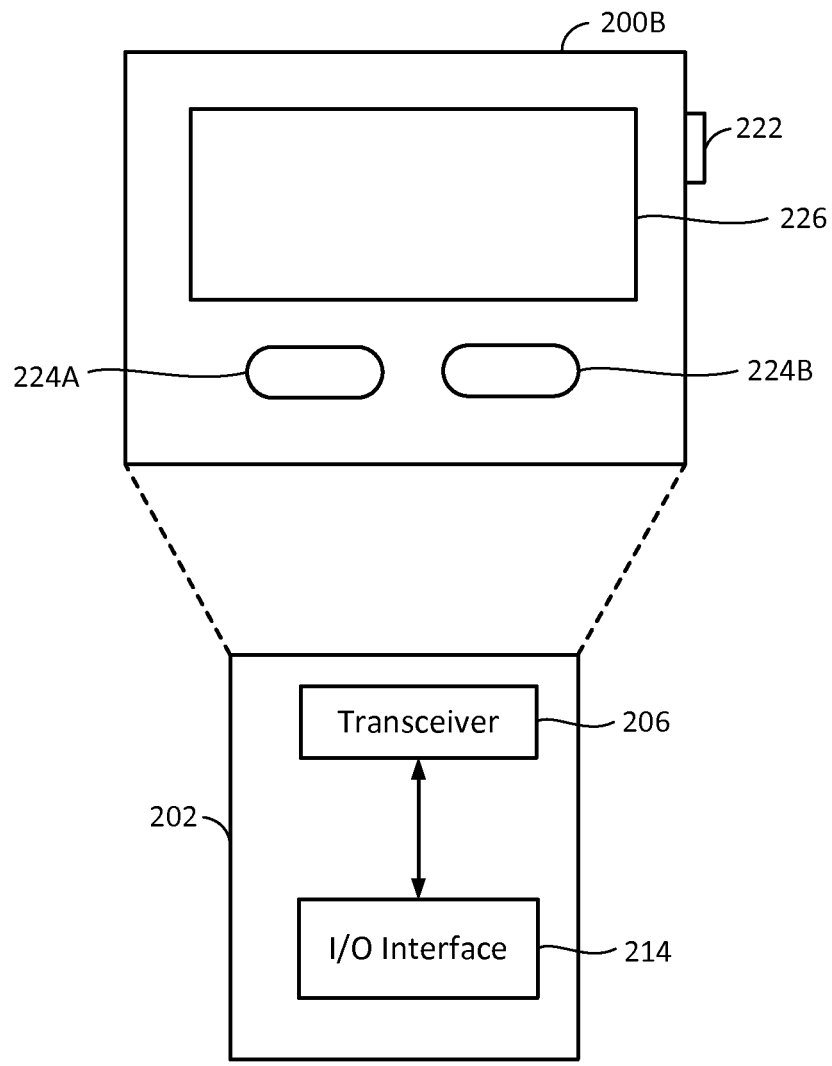
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
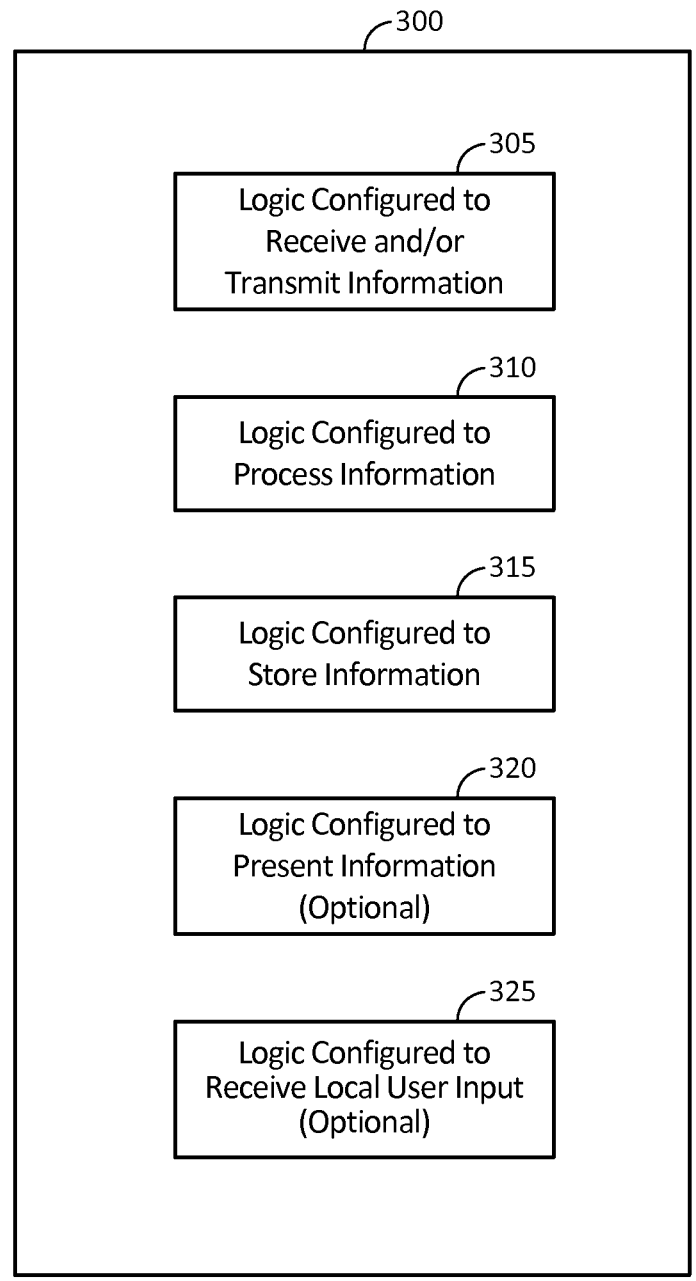
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
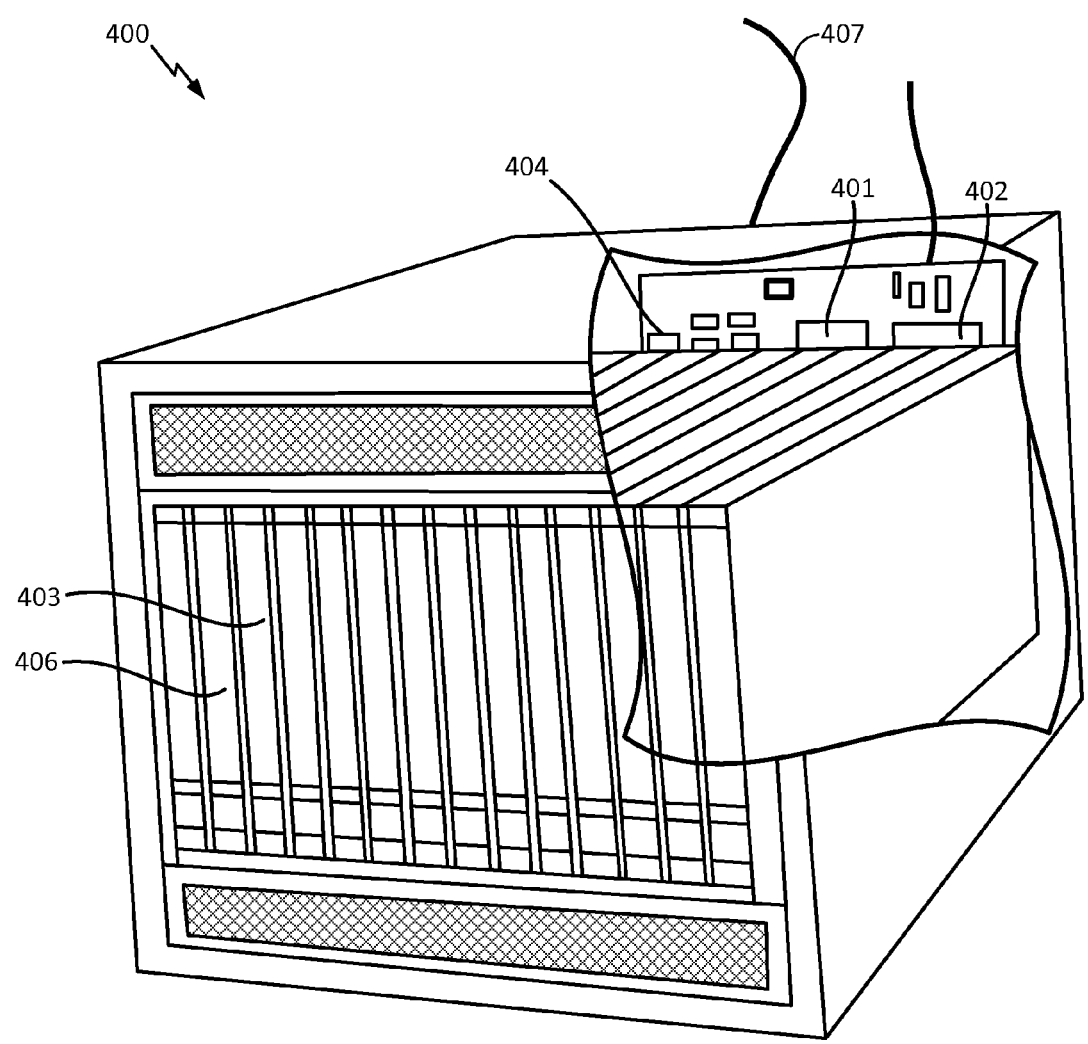
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

Figure 5:
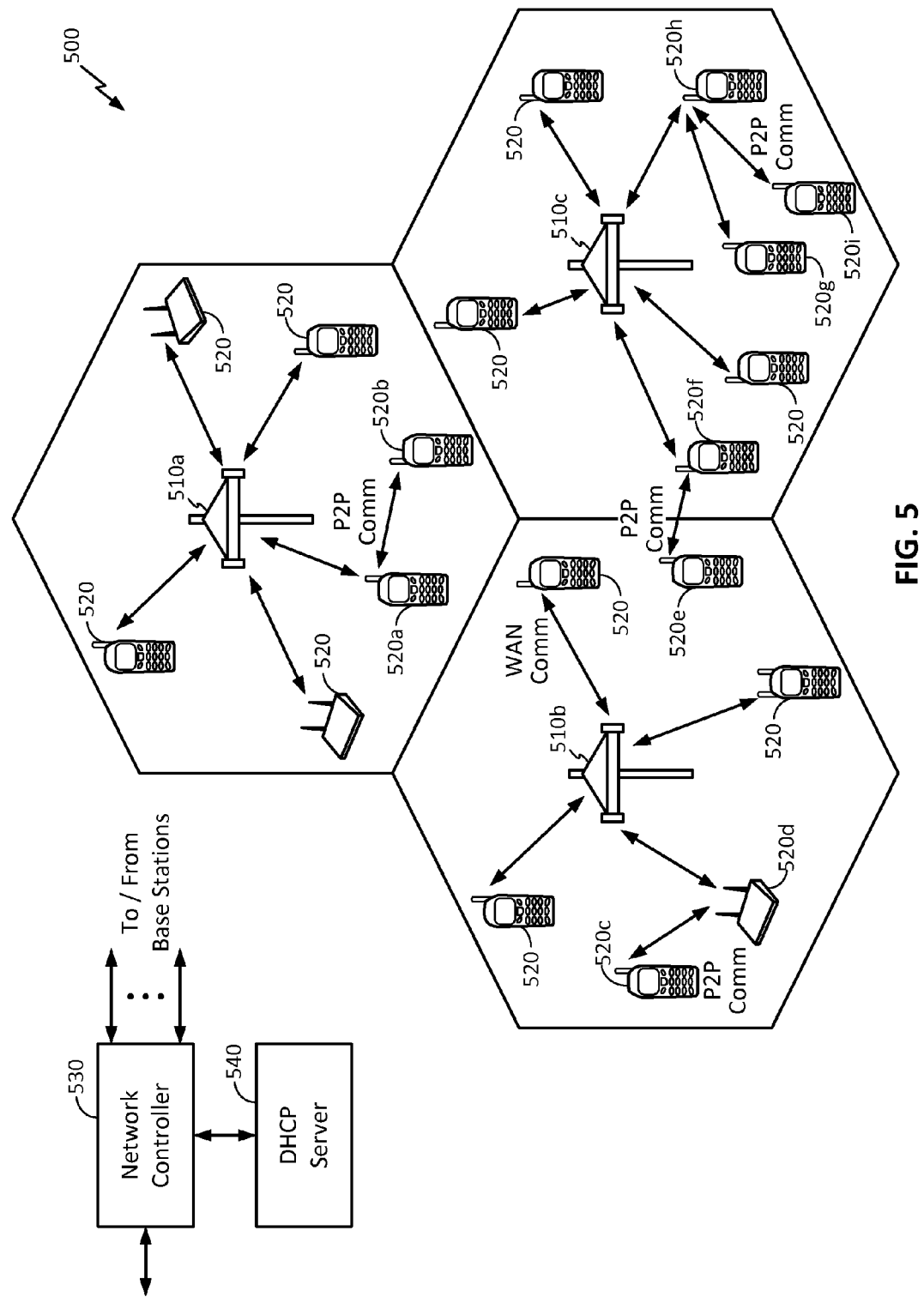
FIG. 5 illustrates a wireless communication network that may support discoverable peer-to-peer (P2P) services, in accordance with one aspect of the disclosure.

In general, user equipment (UE) such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520*a* and 520*b* under the coverage of base station 510*a*, a second P2P group includes devices 520*c* and 520*d* under the coverage of base station 510*b*, a third P2P group includes devices 520*e* and 520*f* under the coverage of different base stations 510*b* and 510*c*, and a fourth P2P group includes devices 520*g*, 520*h* and 520*i* under the coverage of base station 510*c*. Devices 520*a*, 520*d*, 520*f*, and 520*h* may be P2P group owners for their respective P2P groups and devices 520*b*, 520*c*, 520*e*, 520*g*, and 520*i* may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520*g* and 520*i*) desire to exchange information, one of the P2P clients may send the information to the P2P group owner (e.g., device 520*h*) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
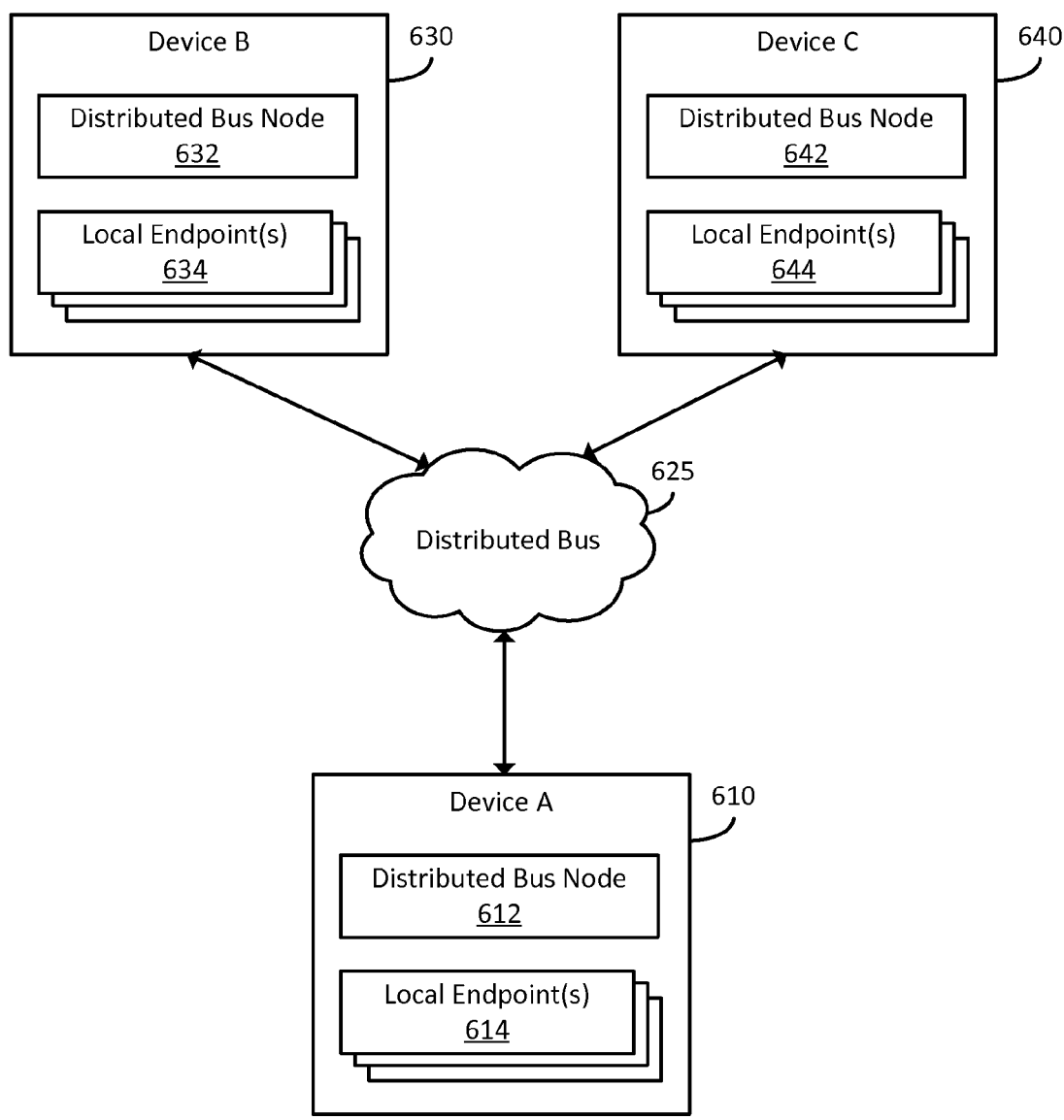
FIG. 6 illustrates an exemplary environment in which discoverable P2P services may be used to establish a proximity-based distributed bus over which various devices may communicate, in accordance with one aspect of the disclosure.

According to an aspect, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an inter-process communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In an embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
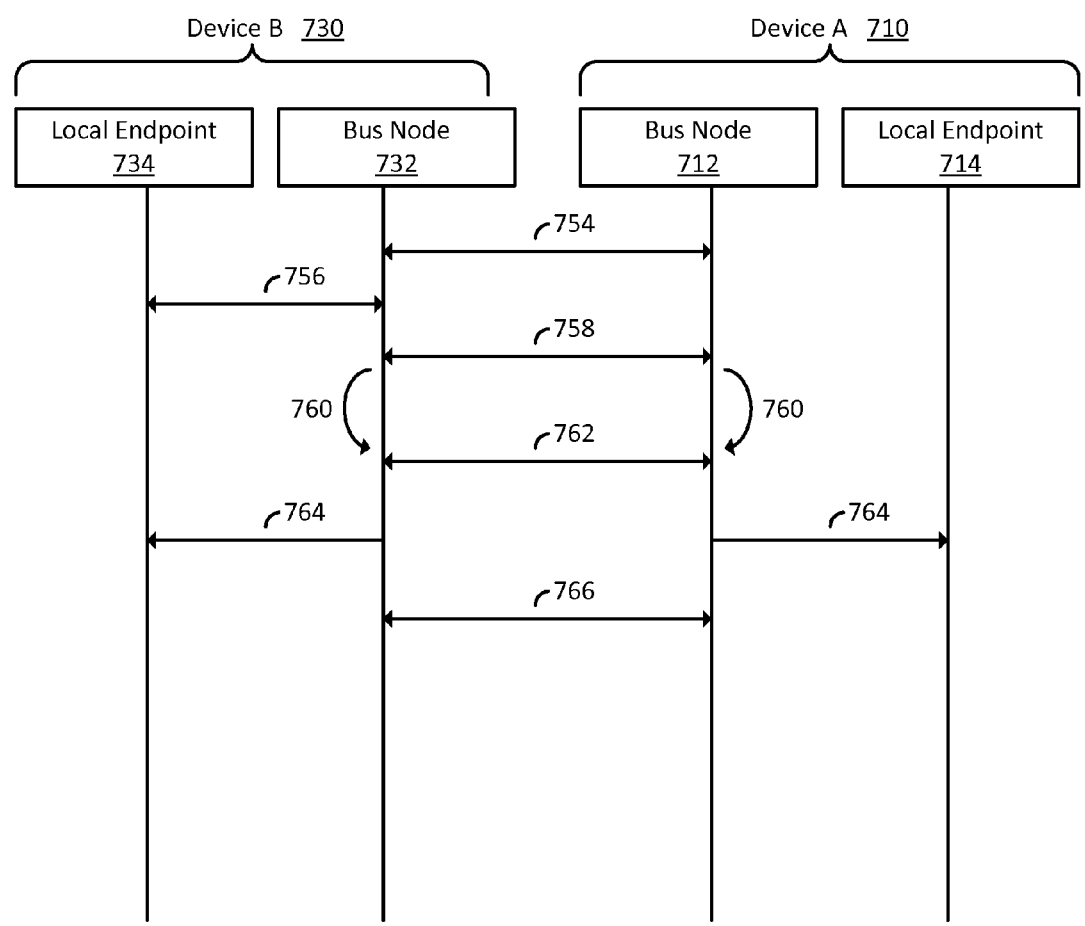
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

Figure 9:
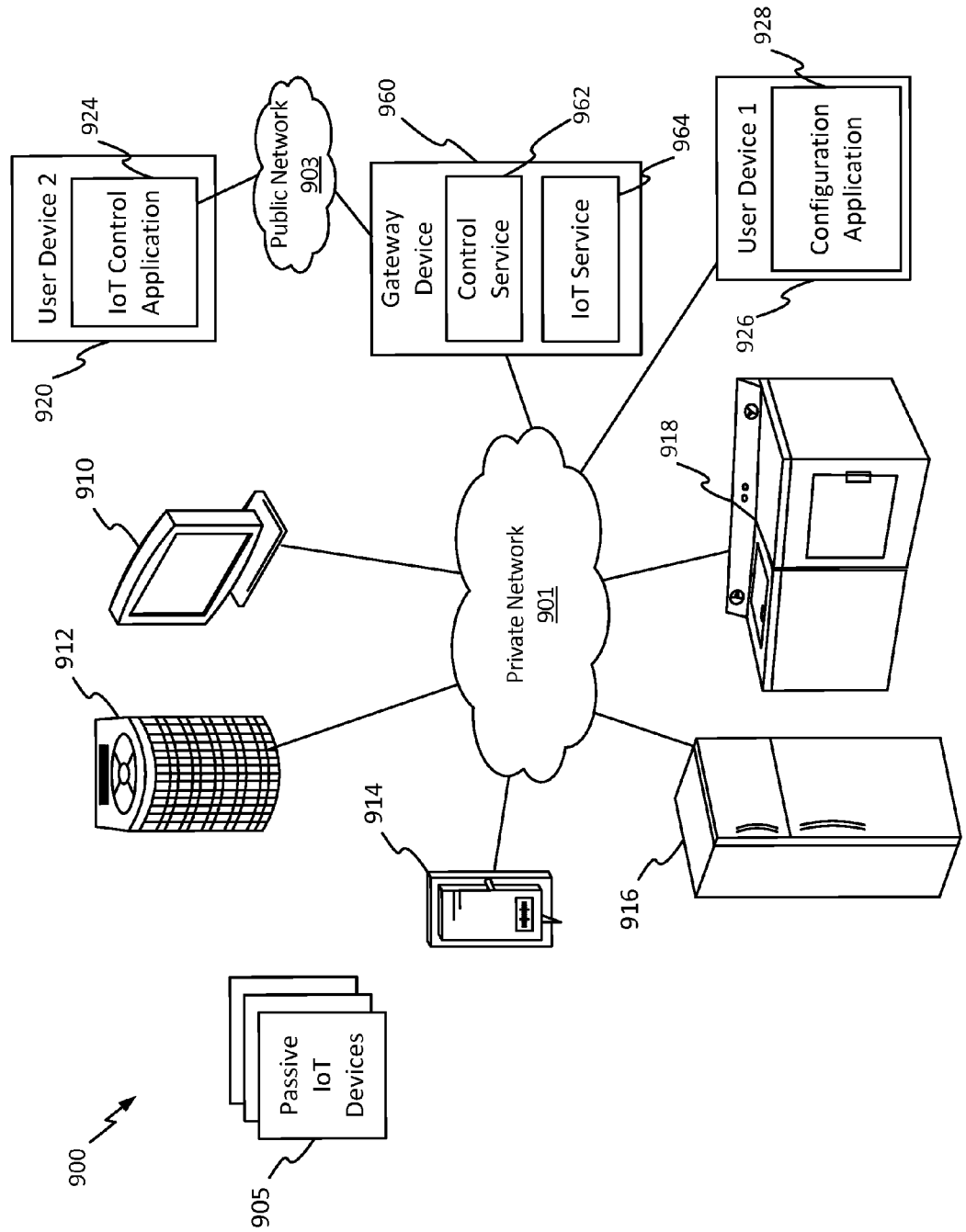
FIG. 9 illustrates a high-level architecture of another wireless communications system that contains a plurality of IoT devices.

According to an aspect, FIG. 9 illustrates a high-level architecture of a wireless communications system 900 that contains a plurality of IoT devices 905-918 (i.e., a network/group of IoT devices 905-918). The wireless communications system 900 includes a private network 901 (e.g., a private home WiFi network, LAN, or a combination of the two) and a public network 903 (e.g., the Internet). A gateway device 960 mediates communication between the private network 901 and the public network 903 including precluding public access to the private network. A control service 962 can also be installed on the gateway device 960, but can be part of the private network 901, and can mediate communication between an IoT service 964, considered to reside on a public side of the gateway device 960, and IoT devices 905-918 on the private network 901. Since the IoT service 964 is on the public network 903 side of the gateway device 960, it is normally blocked from accessing the private network 901. However, the control service 962 can create an exception in the rules excluding external access to the private network 901 and allows the IoT service 964 to access those APIs that the user has authorized. Such an exception may only be allowed where user authorization is given, and further, such access may be granted only for a specified time or specified times as per the user's instructions.

To carry out these functions, the control service 962 monitors the APIs that are available on the private network 901 and matches them to APIs requested by the IoT service 964. Enabling this is the fact that the IoT devices 905-918 periodically broadcast their available APIs. Also, when an IoT device 905-916 enters the private network 901, the IoT device 905-916 can immediately broadcast its available APIs and then periodically broadcast its available APIs thereafter. Whenever an API comes online on an IoT device 905-918 that was already on the private network 901, the IoT device 905-918 can immediately broadcast the existence of the new API and then continue its periodic broadcasting of all available APIs on that device.

The control service 962, which can be visible to the IoT devices 905-918 on the private network 901, monitors and records the APIs broadcasted by the various IoT devices 905-918, and can store the available APIs in a memory assigned to the control service 962 (e.g., a memory of the gateway device 960). In an embodiment, such a stored list of available APIs can be referred to as an "access control list." The control service 962 also tracks which devices provide which APIs; this can be especially important where more than one IoT device 905-918 provides the same API (e.g., a home may have two air conditioning units each having the same climate control API). At the same time, the control service 962 monitors requests for APIs from the IoT service 964, where the requests may only include information about the API—none regarding a device implementing the API. For instance, the IoT service 964 may request access to a climate control API on the private network 901, regardless as to the IoT device(s) 905-918 running the requested API. In other words, the present disclosure enables an IoT service 964 to request a function within the private network rather than having to request a given device known to have a desired function (i.e., requests can be made in terms of functions rather than in terms of IoT devices 905-918).

Given one or more requested APIs, the control service 962 matches requested APIs to available APIs. Where a match occurs, a corresponding record can be created in a memory assigned to the control service 962, for instance, in the access control list, or some other portion of the memory assigned to the control service 962.

A match does not necessarily mean that the IoT service 964 will have access to the requested API. In an embodiment, access may only be granted after user authorization is given, and users are only pressed to give authorization when a match occurs. This decreases the burden on users while also providing oversight as to what IoT services 964 gain access to the IoT devices 905-918. So, given a match, an authorization request can be passed to a user, wherein access to each requested API is only granted if a user authorizes the same (i.e., if the control service 962 receives an authorization in response to sending an authorization request). Where the control service 962 resides on the gateway device 960, a request can be passed to the first user device 926 requesting authorization to allow the IoT service 964 to access each of the one or more requested APIs that are matched with available APIs. Such a request may be presented in a web application, an application installed on the operating system of the first user device 926, an e-mail, a form of instant messaging, or any other means that enables an authorization request to be presented to the user via the first user device 926. Where two or more of the same API are available from different IoT devices 905-918, the authorization request can also ask the user to specify which of the multiple devices having the requested API should be used, although this is not required. In other instances, the control service 962 can automatically select from among multiple devices each having the same API based on various pre-programmed factors or a predefined algorithm.

Figure 11:
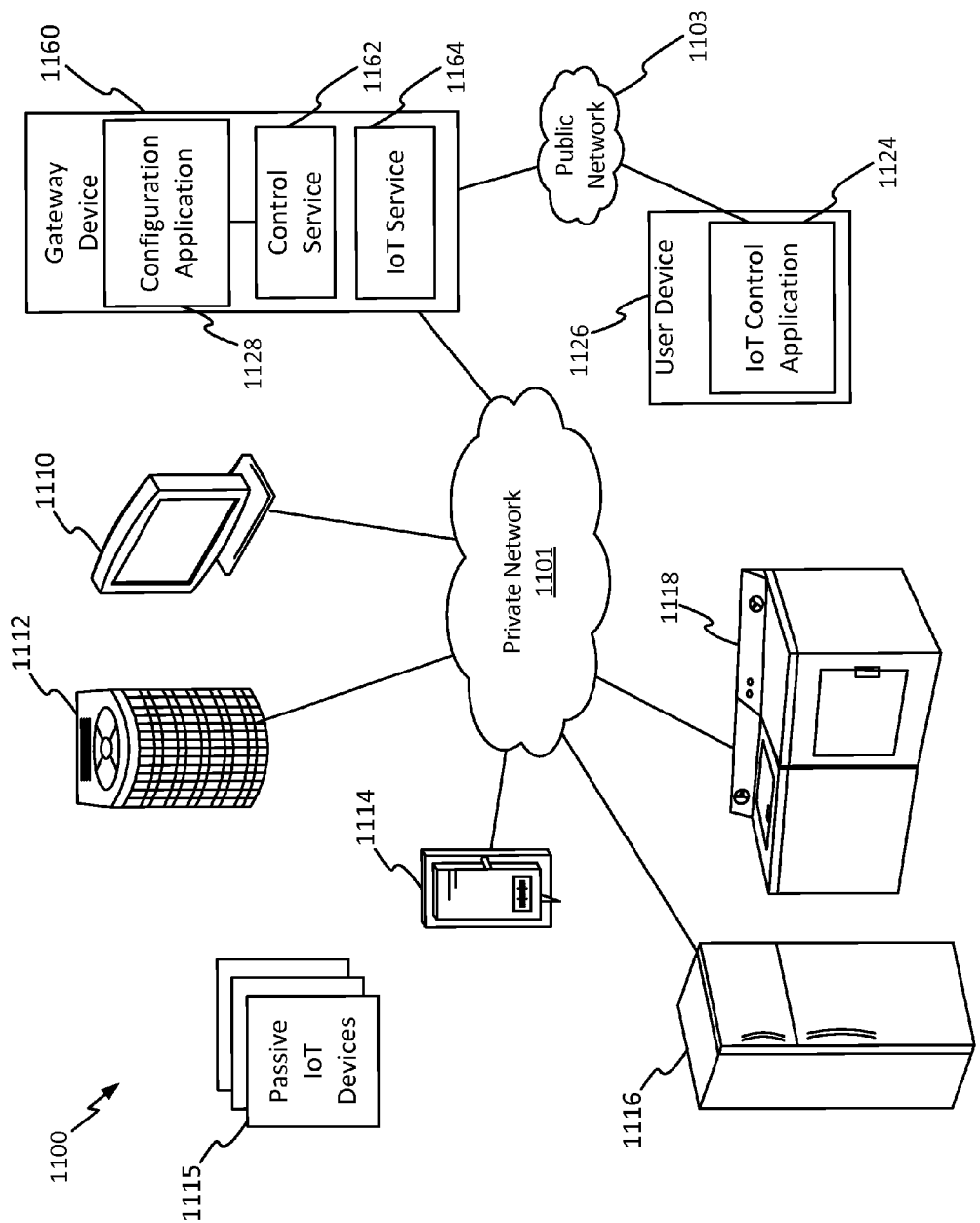
FIG. 11 illustrates a high-level architecture of another wireless system that contains a plurality of IoT devices.

Further, the request from the control service 962 and/or the authorization from the user may include timing associated with the granting of access. For instance, the user may authorize access for a certain period of time, for certain periods of time in a recurring fashion, or for certain periods of time in a recurring fashion for a limited period, to name a few non-limiting examples. Where the IoT service 964 also provides means for a user on the public Internet to gain access and/or control to an IoT device 905-918 in the private network 901, the user can also specify which users or user devices are to be given such access. Controlling parameters of access can be enabled by a configuration application 928, where the configuration application 928 can prompt a user for authorization of API requests and can further provide a user interface for the user to place limits and qualifications on the authorization (e.g., setting a time period for authorization). The configuration application 928 then passes the authorization, and any time limits or user limits on the authorization, back to the gateway device 960 and the control service 962. The control service 962 then records the authorization(s) from the user in the access control list. In other words, the configuration application 928 gives a user the ability to control and modify the access control list of the control service 962. In an embodiment, the configuration application can reside on the gateway device 960, as shown in FIG. 11.

Once the user has granted authorization for the IoT service 964 to access one or more APIs, and assuming any restrictions on the access are met, the IoT service 964 may begin making calls to the authorized APIs. The IoT service 964 then acts as an intermediary between an IoT device 905-918 and an application or servers on the public network 903. For instance, the IoT service 964 can provide data collected from an IoT device 905-918 to an application on the public Internet such as a crowdsourced energy usage application or a smartphone app for remotely monitoring a home security camera, to name two examples. In another instance, the IoT service 964 can provide control of a function of an IoT device to an application on the public Internet such as an app for remotely adjusting a temperature of a home.

Figure 10:
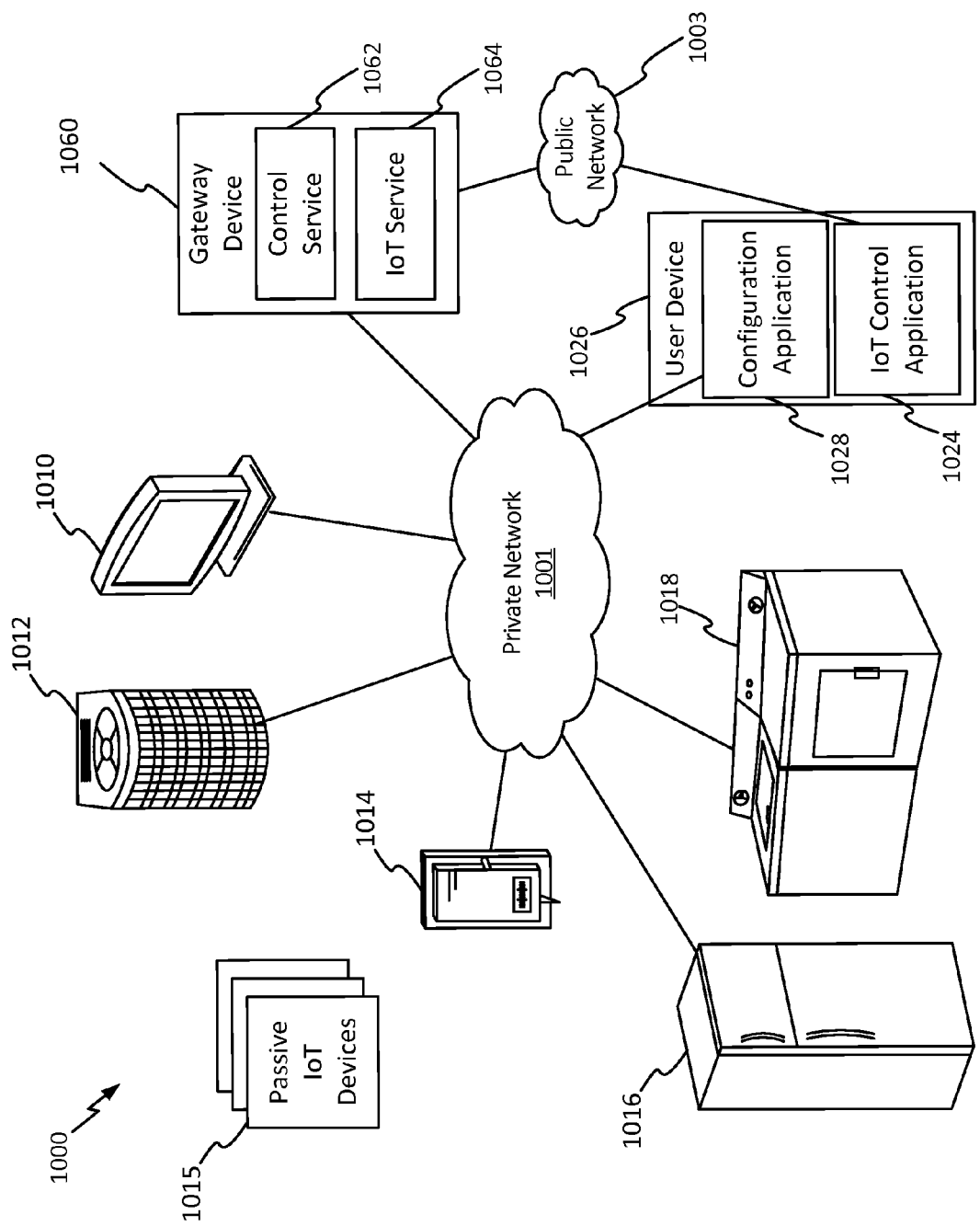
FIG. 10 illustrates a high-level architecture of another wireless communications system that contains a plurality of IoT devices.

A second user device 920 can host an IoT control application 924 that embodies this functionality. In particular, when a user authorizes the control service 962 to access one or more APIs of IoT devices, the user may also authorize the IoT control application 924 to have access to one or more of these authorized APIs, and may grant this authorization for some time period(s). Alternatively, the IoT control application 924 on the second user device 920 can authenticate itself with the gateway device 960 (e.g., via a login and password), and once trusted, the IoT control application 924 can request access to and be granted access to one or more APIs of IoT devices. Via the authorized APIs, the IoT control application 924 can access and control IoT devices via authorized APIs, and can perform this access and control at a user's behest via a user interface of the second user device 920 (e.g., a smartphone app for setting a remote video recording function of the television 910). In FIG. 10 an embodiment is illustrated where the IoT control application 1024 is also on the user device 1026 and will be described in detail later in this document.

While the user can grant authorization and place limits on the time or time periods where authorization to access an API of an IoT is granted, and to which users or devices authorization is granted, the user can also modify the authorization at a later point, even including revoking a previously granted authorization. Even after the initial authorization is provided for the IoT service 964 to access one or more requested APIs, the configuration application 928 can be used to modify the access control list of the control service 962. In this way, the user can remotely alter authorizations and qualifications on authorizations. For instance, an IoT service 964 may be initially authorized unlimited access to an API for controlling a temperature of an HVAC unit 912. However, a user may later determine that too much control over the temperature has been granted, and can then modify the access authorized such that access is only authorized when an external temperature is less than 60° F. or greater than 75° F. As seen, the configuration application 928 can be used to modify the access control list at any time after authorization is initially granted.

To further elucidate the operation of the system 900, the IoT service 964 can be embodied by a weather monitoring application seeking data from temperature sensors within the private network 901. This application can be installed on the gateway device 960 and request access to a temperature API on the private network 901. The weather monitoring application may not know whether a temperature API exists on the private network 901, which device(s) may have a temperature API, or how many temperature APIs may exist on the private network 901. Thus, the request can be made with little to no knowledge as to what exists beyond the gateway device 960. The request can be passed to or received by the control service 962, which will have been monitoring the private network 901 and updating an access control list with APIs that are available (e.g., have been broadcast by one or more of the IoT devices 905-918). If a temperature API exists (i.e., there is a match), then the control service 962 can oversee the granting of access from the weather monitoring application to the available temperature API or coordinate access where more than one IoT device 905-918 has the requested temperature API. This can involve making an authorization request to a user and receiving an authorization from the user (or a denial of access), and any qualifications on access (e.g., a time limit or limits on the other users that can have access through the exception). Assuming access is granted, the control service 962 can then create an exception in the gateway device's 960 rules to allow the weather monitoring application to access the matching API or one of the matching APIs where more than one is available. The weather monitoring application can then report the readings from the temperature API back to servers on the public Internet that conglomerate temperature data from a plurality of devices in a region.

Although the control service 962 is illustrated as being on the gateway device 960, in other embodiments the control service 962 can reside off of the gateway device, for instance on other devices. Although the gateway device 960 and the first user device 926 have been described as separate components with separate functionality, in some instances, they can be the same component, and functionality of the control service 962, the configuration application 928, and the IoT service 964 can all operate on the same component (e.g., a user's smartphone or a standalone box powered via electrical outlet, to name two non-limiting examples).

In some instances the gateway device 960 may be an access point (e.g., Wi-Fi router or Wi-Fi network extender), while in other instances it may be a separate device from the access point. Where two or more IoT devices broadcast that they are making available the same API, and this API is requested by the IoT service 964, the control service 962, via the configuration application 928 may prompt the user to authorize the access and also specify which device or devices the IoT service 964 is to be granted access to. For instance, where an IoT service 964 requests access to an API for turning on a light bulb, and there are forty light bulbs in a home having the requested API, the user can be prompted to grant access to any one or more of the API instances. Further, while access can be granted to requested APIs, a user can also grant access to entire devices rather than just a single API on a device. This functionality is also embodied in the configuration application 928.

As can be seen, devices and applications external to the private network 901 can only access the private network 901 via the gateway device 960 and, in an embodiment, only when access to a requested API is authorized by the user via the control service 962 and the configuration application 928. Further, it can be seen that authorization is given relative to a specific API on a specific device, since the same API may be provided by multiple IoT devices, and thus merely granting access to a specific API could grant access to devices that a user does not wish to make available to an IoT service 964.

The gateway device 960 can take a variety of forms. For instance, the gateway device 960 can be a wireless access point, a WiFi hotspot (e.g., a portable hotspot such as the VERIZON JETPACK or a mobile phone having hotspot functionality), a modem, a router, an Ethernet gateway, a LAN gateway, a proxy server, a device that interfaces between two networks that use different protocols, a network address translation device, a firewall server, a dynamic host configuration protocol (DHCP) server, a computer server, or any other computer or computing device configured to perform the functions of the herein described gateway device 960.

According to one aspect of the disclosure, FIG. 10 illustrates a high-level architecture of another wireless communications system 1000 that contains a plurality of IoT devices 1010-1018. The wireless communications system 1000 again includes a private network 1001 and a public network 1003 where a gateway device 1060 controls (e.g., selectively precludes) communication between the private network 1001 and the public network 1003. Here again the control service 1062 can reside on either the gateway device 1060, the user device 1026, or be distributed between the two, and again presents requests for API access from an IoT service 1064 to the user via a configuration application 1028, records user authorization in response to these requests in an access control list, and then controls access to requested APIs based on the recorded authorizations in the access control list. As in FIG. 9, the configuration application 1028 can be considered part of the private network 1001 and communicates with the control service 1062 via the private network 1001. Once the IoT service 1064 has been given access to requested APIs, the IoT service 1064 can access the requested APIs.

Further, an IoT control application 1024 on the user device 1026 can authenticate itself with the gateway device 1060 (e.g., via a login and password). Once the IoT control application 1024 is trusted, it can request access to and be granted access to one or more APIs of the IoT devices 1010-1018. Via the authorized APIs, the IoT control application 1024 can access and control IoT devices 1010-1018 via authorized APIs, and can perform this access and control at a user's behest via a user interface of the user device 1026. Thus, the same user device 1026 can have a configuration application 1028 which is part of the private network 1001 and communicates with the gateway device 1060 and IoT devices 1010-1018 via the private network 1001, while also having an IoT control application 1024 which is on the public network 1003 and can only access the private network 1001 via the gateway device 1060.

The request to access one or more API's can be received via a request input to the control service 1062. The gateway device 1060 can take a variety of forms. For instance, the gateway device 1060 can be a wireless access point, a WiFi hotspot (e.g., a portable hotspot such as the VERIZON JETPACK or a mobile phone having hotspot functionality), a modem, a router, an Ethernet gateway, a LAN gateway, a proxy server, a device that interfaces between two networks that use different protocols, a network address translation device, a firewall server, a dynamic host configuration protocol (DHCP) server, a computer server, or any other computer or computing device configured to perform the functions of a gateway.

According to one aspect of the disclosure, FIG. 11 illustrates a high-level architecture of another wireless communications system 1100 that contains a plurality of IoT devices 1110-1118. The wireless communications system 1100 again includes a private network 1101 and a public network 1115 where a gateway device 1160 controls communication between the private network 1101 and the public network 1103. Here again the control service 1162 can reside on the gateway device 1160, the user device 1126, or can be distributed between the two. However, here, a configuration application 1128 resides on the gateway device 1160 and presents authorization requests to a user via an interface of the gateway device 1160. The configuration application 1128 again records user authorization in response to these requests in an access control list, and then controls access to requested APIs based on the recorded authorizations in the access control list. The configuration application 1128 can communicate with the control service 1162 via inter-process communications on the gateway device 1160. In some instances, the configuration application 1128 and the control service 1162 can even be one and the same component. Once the IoT service 1164 has been given access to requested APIs, the IoT service 1164 can access the requested APIs.

As in FIG. 10, a user device 1126 can host an IoT control application 1124 that authenticates itself with the gateway device 1160 (e.g., via a login and password). Once the IoT control application 1124 is trusted, it can request access to and be granted access to one or more APIs of IoT devices 1110-1118. Via the authorized APIs, the IoT control application 1124 can access and control IoT devices 1110-1118 via authorized APIs, and can perform this access and control at a user's behest via a user interface of the user device 1126. The IoT control application 1124 can be considered part of the public network 1115 and can only interact with APIs of the IoT devices 1110-1118 via the gateway device 1160.

The request to access one or more API's can be received via a request input to the control service 1162. The request input can receive the request from the IoT service 1164 on the public network 1115 and provide the request to the control service 1162 on the private network 1101. The gateway device 1160 can take a variety of forms. For instance, the gateway device 1160 can be a wireless access point, a WIFI hotspot (e.g., a portable hotspot such as the VERIZON JETPACK or a mobile phone having hotspot functionality), a modem, a router, an Ethernet gateway, a LAN gateway, a proxy server, a device that interfaces between two networks that use different protocols, a network address translation device, a firewall server, a dynamic host configuration protocol (DHCP) server, a computer server, or any other computer or computing device configured to perform the functions of a gateway.

While the IoT services 964, 1064, 1164, have been illustrated and described as residing on the gateway devices 960, 1060, 1160, respectively, in other embodiments the IoT service can be remote from the gateway device. In such cases, the IoT service would first authenticate itself with the gateway device and then be able to request access to one or more APIs within the private network 901, 1001, 1101. Operations would then proceed as described above relative to the IoT services 964, 1064, 1164 residing on the gateway device 1160.

The IoT devices 905-918, 1010-1018, 1110-1118, may be part of a peer-to-peer (P2P) network. In such a case, the IoT devices 905-918, 1010-1018, 1110-1118 can communicate with each other directly over the private network 901, 1001, 1101. Alternatively, or additionally, some or all of IoT devices 905-918, 1010-1018, 1101-1106 may be configured with a communication interface independent of an interface to the private network 901, 1001, 1101. For example, if the interface to the private network 901, 1001, 1101 corresponds to a Wi-Fi interface, one or more of the IoT devices 905-918, 1010-1018, 1110-1118 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

In general, the passive IoT devices 905, 1015, 1115 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 905, 1015, 1115 may include a coffee cup and a container of orange juice that each have an RFID tag or barcode. A cabinet IoT device and the refrigerator IoT device 916, 1016, 1105 may each have an appropriate scanner or reader that can read the RFID tag or barcode to detect when the coffee cup and/or the container of orange juice passive IoT devices 905, 1015, 1115 have been added or removed. In response to the cabinet IoT device detecting the removal of the coffee cup passive IoT device 905, 1015, 1115 and the refrigerator IoT device 916, 1016, 1105 detecting the removal of the container of orange juice passive IoT device, the IoT service 964, 1064, 1164 may receive one or more signals that relate to the activities detected at the cabinet IoT device and the refrigerator IoT device 916, 1016, 1105. The IoT service 964, 1064, 1164 may then infer that a user is drinking orange juice from the coffee cup and/or likes to drink orange juice from a coffee cup.

Although the foregoing describes the passive IoT devices 905, 1015, 1115 as having some form of RFID tag or barcode communication interface, the passive IoT devices 905, 1015, 1115 may include one or more devices or other physical objects that do not have such communication capabilities. For example, certain IoT devices may have appropriate scanner or reader mechanisms that can detect shapes, sizes, colors, and/or other observable features associated with the passive IoT devices 905, 1015, 1115 to identify the passive IoT devices 905, 1015, 1115. In this manner, any suitable physical object may communicate its identity and attributes and become part of the private network 901, 1001, 1101 and be observed, monitored, controlled, or otherwise managed with the IoT service 964, 1064, 1164. Further, passive IoT devices 905, 1015, 1115 may be coupled to or otherwise made part of the private network 901, 1001, 1101 and observed, monitored, controlled, or otherwise managed in a substantially similar manner.

Enabling Dynamic Connectivity Between Apps and Devices in an IoT Network

Another aspect of this disclosure includes systems, methods, and apparatuses for dynamic connectivity between applications and IoT devices and/or functionality thereof. In particular, systems, methods, and apparatuses are disclosed for dynamically controlling third-party application access to IoT devices and/or functions thereof. Apps that are downloaded to a private network, hereinafter referred to as $3^{rd}$ party apps, include a list of IoT devices or device functionality that the $3^{rd}$ party app desires to access. This information can be stored in a manifest file for each $3^{rd}$ party app. An app connectivity service (or ACS) can connect $3^{rd}$ party apps to an appropriate set of IoT devices or functions based on the manifest file for each $3^{rd}$ party app. In one embodiment the app connectivity service can initiate a discovery announcement where returned messages indicate available IoT devices. Alternatively, IoT devices can periodically announce their availability and/or functions and in this way the app connectivity service can determine a list of IoT devices and/or functions that are available. Whichever discovery method is used, the app connectivity service can identify IoT devices and/or functions that match the manifest file. Matches can be presented to a user via a user interface, and the user can grant or deny access for the $3^{rd}$ party app to access IoT devices or functions that match its manifest file. The user can grant or deny access to one or more IoT devices or functions including groups or sets of IoT devices and functions.

Figure 12:
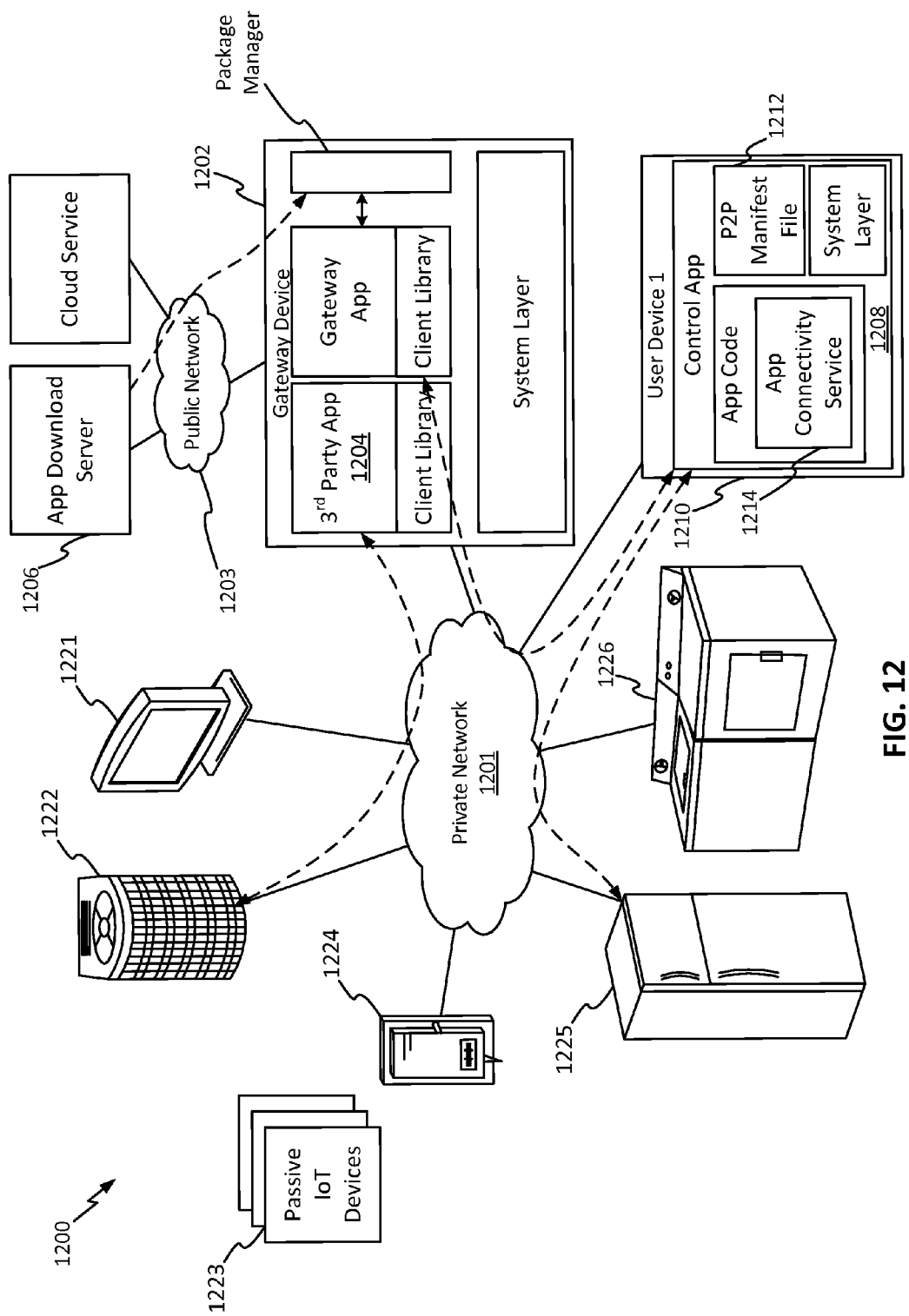
FIG. 12 illustrates a public and private network mediated by a gateway device where a control app governs a $3^{rd}$ party's access to IoT devices on the private network.

In one embodiment, the $3^{rd}$ party apps can be installed on a gateway while the app connectivity service resides on a control app external to the gateway but part of the same private network. FIG. 12 illustrates one embodiment of such a system. The system 1200 includes a plurality of IoT devices 1221-1226 on a private network 1201. A gateway device 1202 is also at least partially on the private network 1201 and is coupled to a public network 1203, such as the Internet. The gateway device 1202 mediates communications and data transfer between the private network 1201 and the public network 1203. A $3^{rd}$ party application 1204 (or "$3^{rd}$ party app") from an app download server 1206 (or any other server or plurality of servers hosting the download of applications) can be offered to a user via a control app 1208 optionally residing on a user device 1210. However, in other embodiments, the control app 1208 can reside on other devices, on one of the IoT devices 1221-1226, on the gateway device 1202, or can be distributed between one or more of the above. The $3^{rd}$ party app 1204 can include a manifest file 1212 (or peer-to-peer manifest file or P2P manifest file) indicating those IoT devices 1221-1226 and/or functions that the $3^{rd}$ party app 1204 wishes to access. The control app 1208 can include modules and memory configured to match the desires of the $3^{rd}$ party app 1204 as recorded in the manifest file 1212 with available IoTs devices and available IoT functions as well as to provide a user the ability to deny or grant the $3^{rd}$ party app 1204 access to desired and available IoT devices. In particular, the control app 1208 can include an app connectivity service 1214 that can determine which IoT devices 1221-1226 and/or functions are being offered on the private network 1201 and record this information (e.g., also in the manifest file 1212).

The control app 1208 can then prompt a user to allow or deny the $3^{rd}$ party app 1204 access to IoT devices 1221-1226 and/or functions that the app connectivity service 1214 identified as desired and also available. Such prompting can take various forms, for instance as a graphical prompt on a display of the user device 1210. The prompting can include one or more $3^{rd}$ party app requests, and the user can grant or deny any one or more of the requests. Access or denial can also be made via groups of requests (e.g., for groups of IoT devices, for certain types of IoT devices, and/or for certain functions of IoT devices, to name a few non-limiting examples).

The app connectivity service 1214 can discover IoT devices 1221-1226 and functions thereof via IoT announce messages, which the IoT devices 1221-1226 can periodically transmit. Such transmissions can be via multicast to the entire private network 1201, or may be unicast to whatever device the app connectivity service 1214 resides on. Alternatively, the app connectivity service 1214 can initiate announce messages and await responses from available IoT devices 1221-1226.

Once the user has allowed and/or denied access to one or more IoT devices 1221-1226 and/or functions therefor, the $3^{rd}$ party app 1204 can be downloaded to the gateway via a package manager. Where no access was granted for a given $3^{rd}$ party app 1204, that app may not be downloaded.

The app connectivity service 1214 also continues to monitor for new IoT announcements, either looking for devices that were not initially seen or for new devices entering the private network 1201. The app connectivity service 1214 also monitors for devices leaving the private network 1201. When a new IoT device appears or enters the network, and the IoT device or functions thereof match desired IoT devices 1221-1226 or functions in the manifest file 1212, the app connectivity service 1214 can again prompt a user to grant or deny the $3^{rd}$ party app's 1204 access to the matching IoT device or function.

Figure 13:
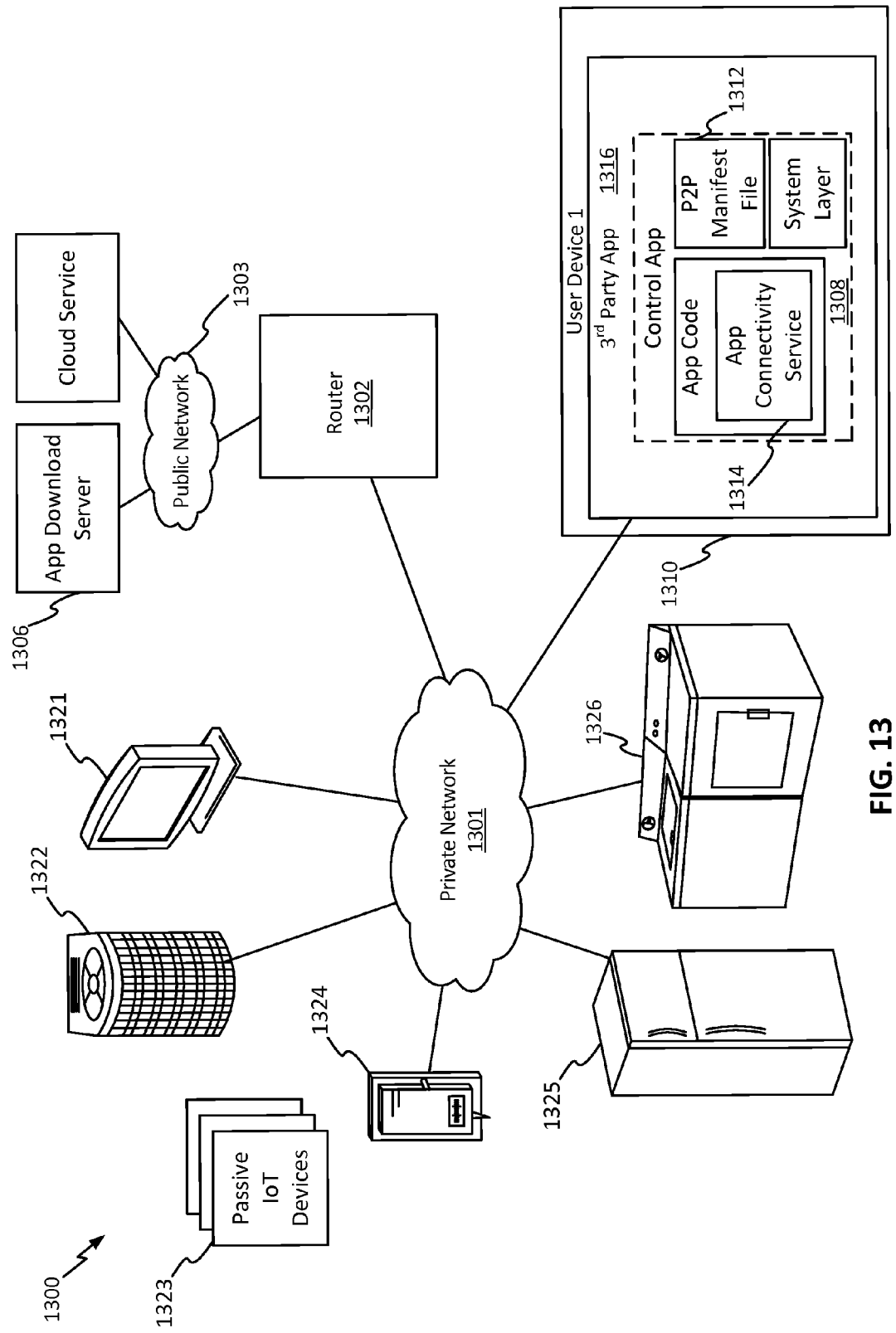
FIG. 13 illustrates a public and private network mediated by a router where an app connectivity service connects a $3^{rd}$ party app on a user device on the private network to desired IoT devices on the private network.

In an alternative embodiment, the app connectivity service 1214 can be offered as part of the $3^{rd}$ party app 1204 itself as illustrated in FIG. 13. In such embodiments, the $3^{rd}$ party app can be downloaded to a gateway device, or to other Internet-connected devices such as a television, tablet computer, or smartphone, to name a few non-limiting examples. In these cases, the $3^{rd}$ party app 1316 is downloaded first, provides a manifest file 1312, and then the app connectivity service 1314 can discover a list of IoT devices 1321-1326 and/or functions thereof that are available and match the manifest file 1312. Matches can again be presented to the user for approval or denial of access. In the embodiment of FIG. 13, the control app 1308 is optional, and thus in some cases the app connectivity service 1314 can be part of the $3^{rd}$ party app 1316 without the optional control app 1308. A router 1302 can interface the private network 1301 and the public network 1303.

In this embodiment, the optional control app 1308 and the app connectivity service 1314 are shown as residing on user device 1310 on the private network 1301. However, the optional control app 1308 and the app connectivity service 1314 could also reside on the router 1302, a gateway device (not illustrated), an Internet-connected device such as a television, tablet computer, or smartphone, on one of the other IoT devices 1321-1326, or within the $3^{rd}$ party app 1316 downloaded onto one of the other IoT devices 1321-1326.

So far, the app connectivity service has been described as discovering IoT devices and their functions. However, the app connectivity service can also discover particular apps on IoT devices.

In a further embodiment, the $3^{rd}$ party app 1416 can be downloaded to an IoT device 1410. The $3^{rd}$ party app can again make desired IoT devices and functions known and saved in a manifest file 1412, and this information can be used by an app connectivity service 1414, to find matches. A user can again be prompted to allow or deny the $3^{rd}$ party app's 1416 access to IoT devices 1421-1426 and/or functions that the $3^{rd}$ party app seeks to access. Once access has been granted, the $3^{rd}$ party app 1416 can begin communicating with those IoT devices and/or functions thereof where the $3^{rd}$ party app 1416 desired access and where user approval occurred.

In this embodiment, an optional control app 1408 and the app connectivity service 1414 are shown as residing on IoT device 1410 on the private network 1401. However, the optional control app 1408 and the app connectivity service 1414 could also reside on the router 1402, a gateway device (not illustrated), an Internet-connected device such as a television, tablet computer, or smartphone, on one of the other IoT devices 1421-1426, or within the $3^{rd}$ party app 1416 downloaded onto one of the other IoT devices 1421-1426.

Regardless as to where the app connectivity service and the $3^{rd}$ party app reside, once access has been denied or granted, the app connectivity service continues to perform discovery in order to track changes to the private network 1401. For instance, the appearance of new IoT devices and/or functions thereof, or the departure of the same, can be recorded. When a new IoT device and/or a function thereof appears on the private network 1401 and it matches a desired IoT device and/or function in the manifest file, the app connectivity service 1414 can again prompt a user to grant or deny access.

Figure 14:
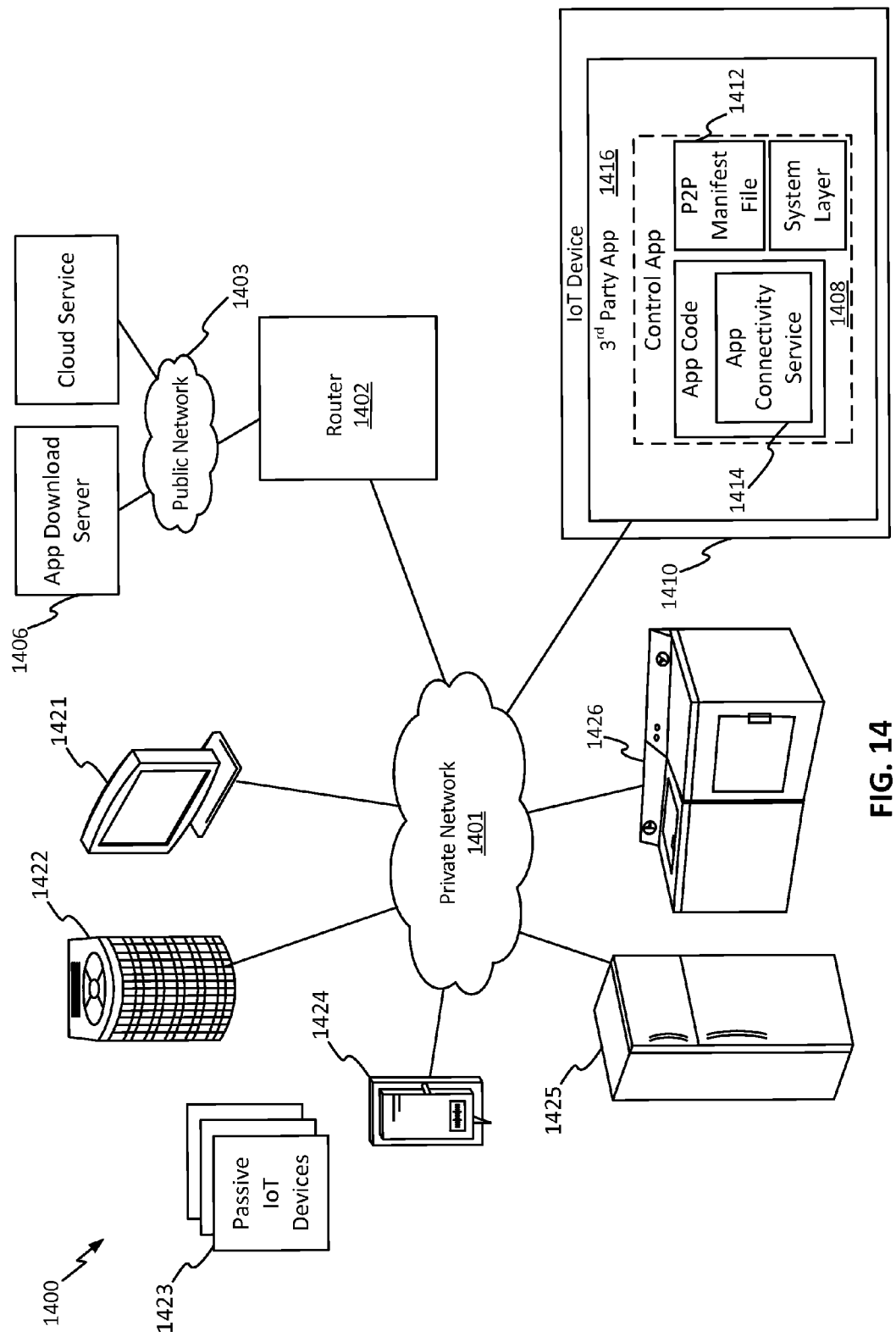
FIG. 14 illustrates a public and private network where an app connectivity service on one of a plurality of IoT devices on the private network connects a $3^{rd}$ party app on the IoT device to other IoT devices on the private network.

There are also two other use cases where the above noted systems, methods, and apparatuses can enable dynamic connectivity between $3^{rd}$ party apps and IoT devices and/or functions thereof. First, dynamic connectivity can be established between apps on generic IoT devices and other IoT devices on the private network 1401. For instance, FIG. 14 illustrates an instance where a $3^{rd}$ party app 1416 on one IoT device 1410 can connect with other IoT devices 1421-1426 and/or functions thereof on other IoT devices in the private network 1401. Second, initial IoT network configuration and enabling of a self-configuring network is possible.

In the first of these two use cases dynamic connectivity could be established between a $3^{rd}$ party app on a generic IoT device (e.g., that is not connected to the Internet). Such devices will provide a $3^{rd}$ party app install mechanism which will be invoked by a control app to install new apps on these generic IoT devices. Downloaded $3^{rd}$ party apps will then declare IoT devices and/or functions that they would like to access on a local IoT network through manifest files. The control app will then match desired interfaces with devices providing those interfaces via discovery. Once a user agrees to allow access to IoT devices and/or functions thereof, the control app establishes security permissions for the IoT devices that are to be accessed to enable secure interfaces on those IoT devices. The control app will also maintain a set of manifest files for the $3^{rd}$ party apps that have been downloaded and will enable connectivity between $3^{rd}$ party apps and IoT devices based on dynamic network updates (e.g., a new device comes into the network supporting an interface desired by the $3^{rd}$ party app).

In the second of these two use cases, there can be a mechanism to enable or configure connectivity between headless IoT devices. Connectivity between these headless IoT devices can be enabled through a manifest file similar to the one mentioned above. Each headless IoT device can declare services that it would like to access on the IoT network, via the manifest file. Then the IoT network can be initially configured and later self-configured or updated. For initial IoT network configuration a control app can fetch the manifest file from one or more headless IoT devices in the IoT network. It then determines a set of other IoT devices on the network which are providing the desired services and establishes access permissions for headless IoT devices to access those IoT devices matching the manifest file. User acknowledgment may also be required. Later as new devices enter the network, the control app can enable self-configuration of the network by establishing access permissions with dynamic discovery of sets of devices.

Profile Based Remote Access Mechanism for IoT Devices

As the Internet-of-things expands, there will be increasing demand for users remote from their homes to access/control IoT devices in their homes. For instance, users may want to monitor a security camera, operating the HVAC, operate entry doors, etc. from remote apps on their smartphones or tablet computers. Enabling such functionality may require secure and convenient means for remote access to IoT devices. The following paragraphs discuss a method of establishing profiles to enable secure remote access to IoT devices via a home gateway or any other gateway to a private network. The proposed scheme includes installing a gateway agent in a private network (e.g., a home LAN) to provide secure remote access to IoT devices from a public network such as the Internet. Access to IoT devices from outside the private network will only be enabled via the gateway agent, thus preventing direct access to the IoT devices from outside the private network. A user can define a profile on the gateway agent that groups one or more IoT devices into one or more groups. For instance, IoT devices may be grouped based on functionality. However, other criteria could also be used, such as groupings based on IoT device type, function type, OEM based groupings, etc., to name a few non-limiting examples. Groupings can even be suggested by a control app, and can then be accepted, modified, or rejected by the user. The user can then enable/disable access to an entire group of IoT devices remotely using the groups in the profile.

The profile can be defined via a control app in the private network. In particular, the control app can generate discovery announcements in the private network and observe those IoT devices that respond. Alternatively, IoT devices can periodically generate announcements, and the control app can add IoT devices to a list when it detects their announce messages. During this discovery process, the control app can identify similar characteristics between devices and generate proposed profile groupings to the user based on these similar characteristics. For instance, suggested groupings could be based on all home entry devices or all ADT security devices. In another example, if a user exposes a garage door in a profile, the control app may suggest that the front door or back door also be added to the group.

Figure 15:
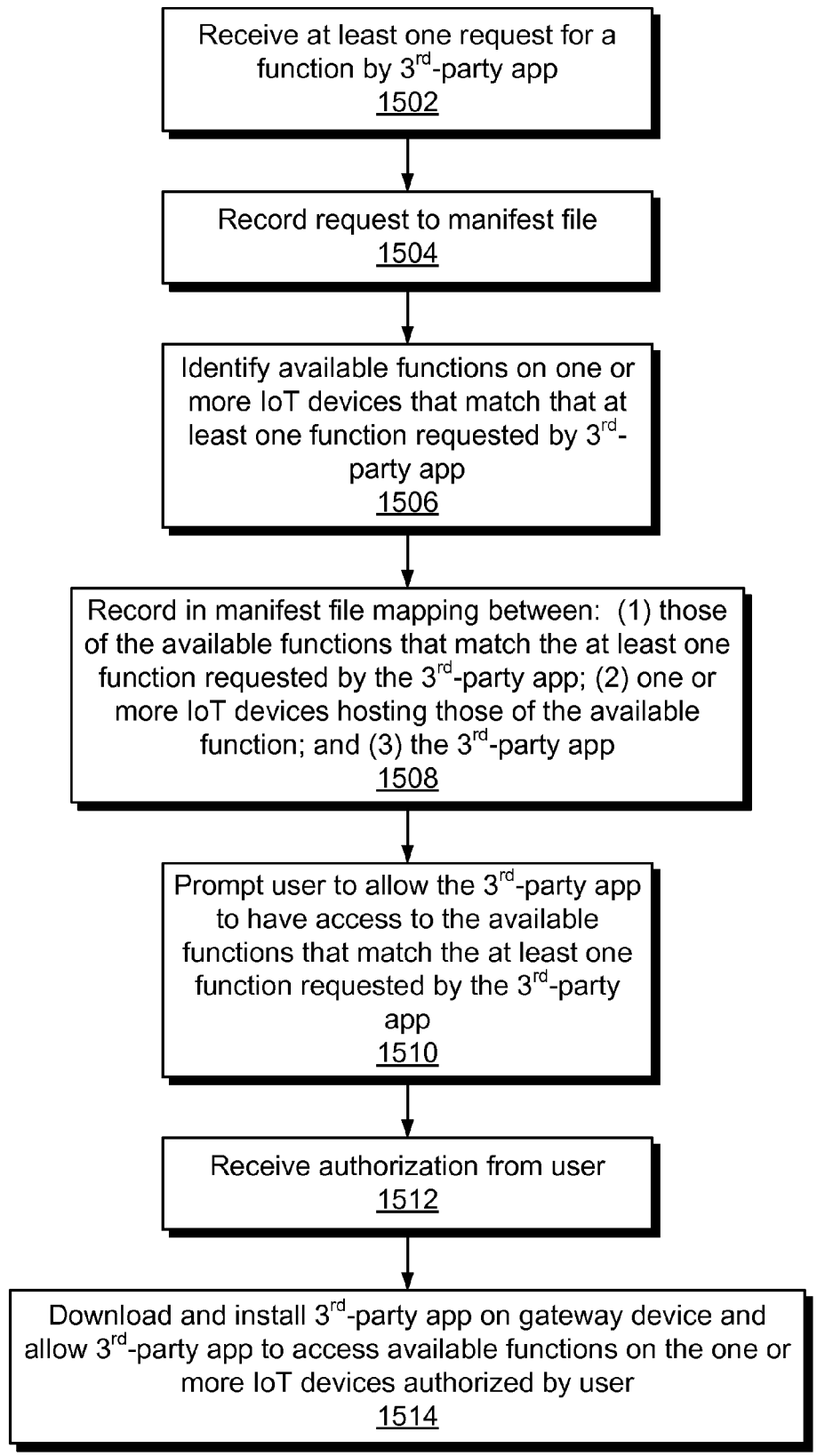
FIG. 15 illustrates a method for controlling the download, install, and access of a third-party application to a gateway device.

FIG. 15 illustrates a method for controlling the download, install, and access of a third-party application to a gateway device. Given a system as illustrated in one of FIGS. 12-14, the method 1500 involves receiving at least one function requested by a third-party app (Block 1502) and recording this request to a manifest file (Block 1504). The method 1500 then identifies available functions on one or more IoT devices that match the at least one function requested by the third-party app (Block 1506). The method 1500 further records in the manifest file a mapping between those of the available functions that match the at least one function requested by the third-party app, one or more IoT devices hosting those of the available functions, and the third-party app (Block 1508). The method 1500 also prompts a user to allow the third-party app to have access to the available functions that match the at least one function requested by the third-party app (Block 1510). Further, upon receiving authorization from the user (Block 1512), the method 1500 downloads and installs the third-party app on the gateway device and allows the third-party app to access the available functions on the one or more IoT devices authorized by the user (Block 1514). The method 1500 can be performed by various components such as an app connectivity service (e.g., 1214, 1314, 1414). Further, the IoT devices can send an announce message in response to polling from the app connectivity service, where one is employed.

Figure 16:
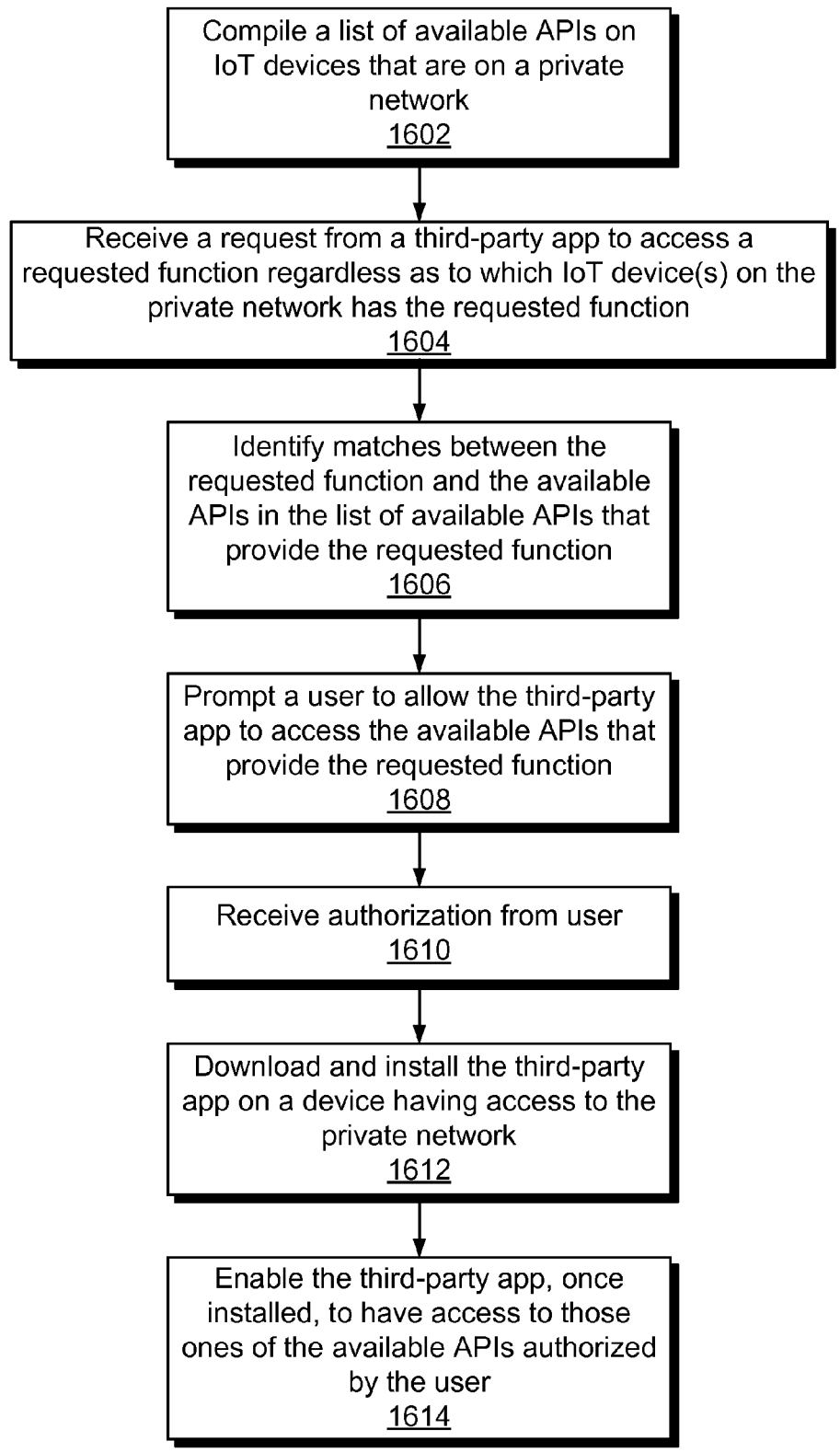
FIG. 16 illustrates a method for illustrates a method of controlling access to intent-of-things (IoT) devices selectively isolated from a public network by a gateway device.

FIG. 16 illustrates a method of controlling access to intent-of-things (IoT) devices selectively isolated from a public network by a gateway device. The method 1600 can include compiling a list of available APIs on IoT devices that are on a private network (Block 1602). The method 1600 can also include receiving a request from a third-party app to access a requested function regardless of an IoT device on the private network having the requested function (Block 1604). The method 1600 can also include identifying matches between the requested function and the available APIs in the list of available APIs that provide the requested function (Block 1606). The method 1600 can yet further include prompting a user to allow the third-party app to access the available APIs that provide the requested function (Block 1608). Upon receiving authorization from the user (Block 1610), the method 1600 can also include downloading and installing the third-party app on a device having access to the private network (Block 1612). Yet further, the method 1600 can include enabling the third-party app, once installed, to have access to those ones of the available APIs authorized by the user (Block 1614).

Figure 8:
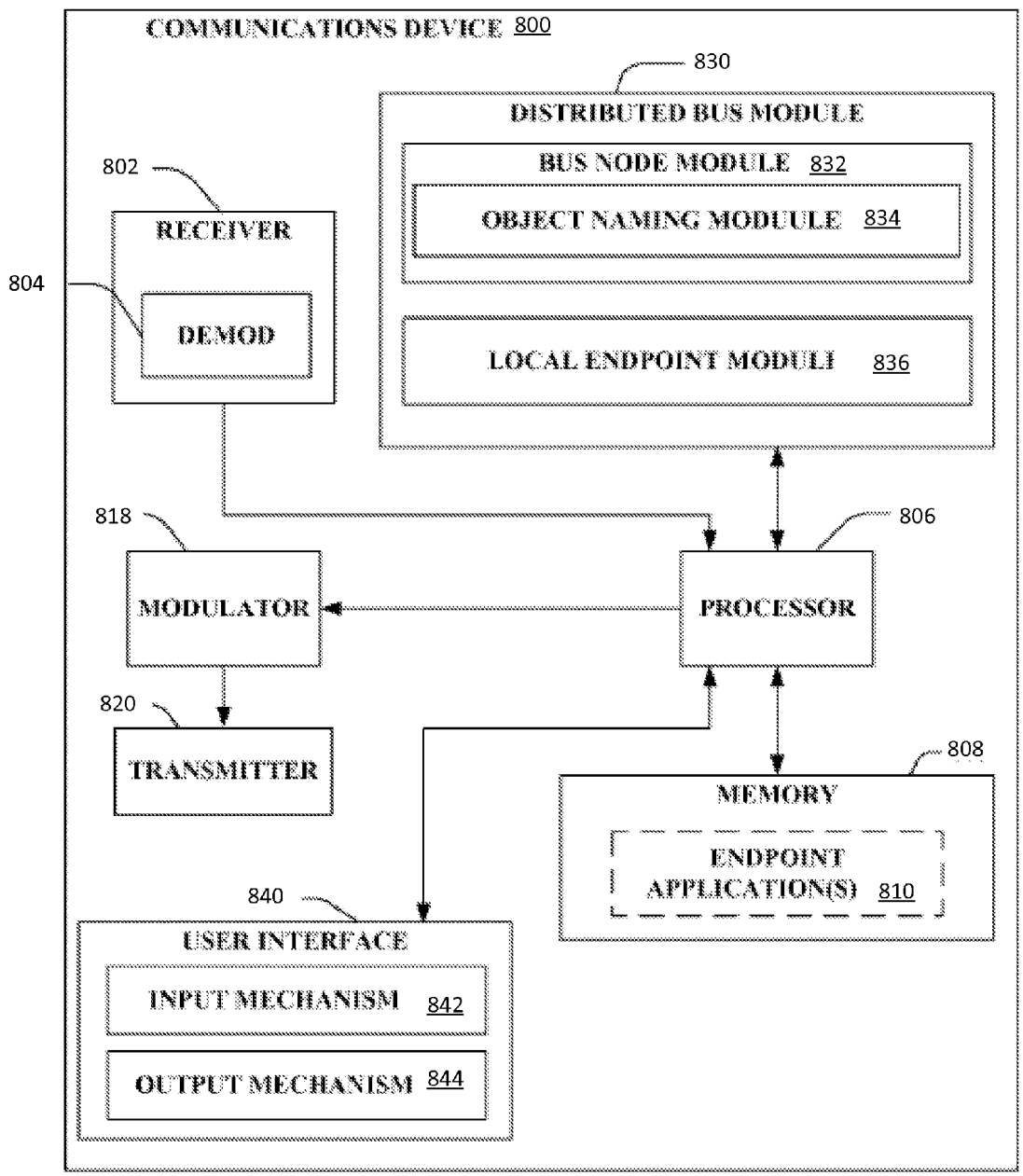
FIG. 8 illustrates an exemplary block diagram that may correspond to a device that uses discoverable P2P services to communicate over a proximity-based distributed bus, in accordance with one aspect of the disclosure.

According to one aspect of the disclosure, FIG. 8 illustrates an exemplary communications device 800 that may correspond to one or more devices that may use discoverable P2P services to communicate over a proximity-based distributed bus, as described in further detail above (e.g., an onboarder device, an onboardee device, an onboarded device, etc.). In particular, as shown in FIG. 8, communications device 800 may comprise a receiver 802 that may receive a signal from, for instance, a receive antenna (not shown), perform typical actions on the received signal (e.g., filtering, amplifying, downconverting, etc.), and digitize the conditioned signal to obtain samples. The receiver 802 can comprise a demodulator 804 that can demodulate received symbols and provide them to a processor 806 for channel estimation. The processor 806 can be a processor dedicated to analyzing information received by the receiver 802 and/or generating information for transmission by a transmitter 820, a processor that controls one or more components of communications device 800, and/or a processor that both analyzes information received by receiver 802, generates information for transmission by transmitter 820, and controls one or more components of communications device 800.

Communications device 800 can additionally comprise a memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. In one aspect, the memory 808 can include local endpoint applications 810, which may seek to communicate with endpoint applications, services etc., on communications device 800 and/or other communications devices 800 associated through distributed bus module 830. Memory 808 can additionally store protocols and/or algorithms associated with estimating and/or utilizing a channel (e.g., performance based, capacity based, etc.).

It will be appreciated that data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory.

Communications device 800 can further include distributed bus module 830 to facilitate establishing connections with other devices, such as communications device 800. Distributed bus module 830 may further comprise bus node module 832 to assist distributed bus module 830 managing communications between multiple devices. In one aspect, a bus node module 832 may further include object naming module 834 to assist bus node module 832 in communicating with endpoint applications 810 associated with other devices. Still further, distributed bus module 830 may include endpoint module 836 to assist local endpoints in communicating with other local endpoints and/or endpoints accessible on other devices through an established distributed bus. In another aspect, distributed bus module 830 may facilitate inter-device and/or intra-device communications over multiple available transports (e.g., Bluetooth, UNIX domain-sockets, TCP/IP, Wi-Fi, etc.).

Additionally, in one embodiment, communications device 800 may include a user interface 840, which may include one or more input mechanisms 842 for generating inputs into communications device 800, and one or more output mechanisms 844 for generating information for consumption by the user of the communications device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, a Personal Area Network (PAN) transceiver etc. In the illustrated aspects, the output mechanism 844 may include an audio speaker operable to render media content in an audio form, a display operable to render media content in an image or video format and/or timed metadata in a textual or visual form, or other suitable output mechanisms. However, in one embodiment, a headless communications device 800 may not include certain input mechanisms 842 and/or output mechanisms 844 because headless devices generally refer to computer systems or device that have been configured to operate without a monitor, keyboard, and/or mouse.

Figure 17:
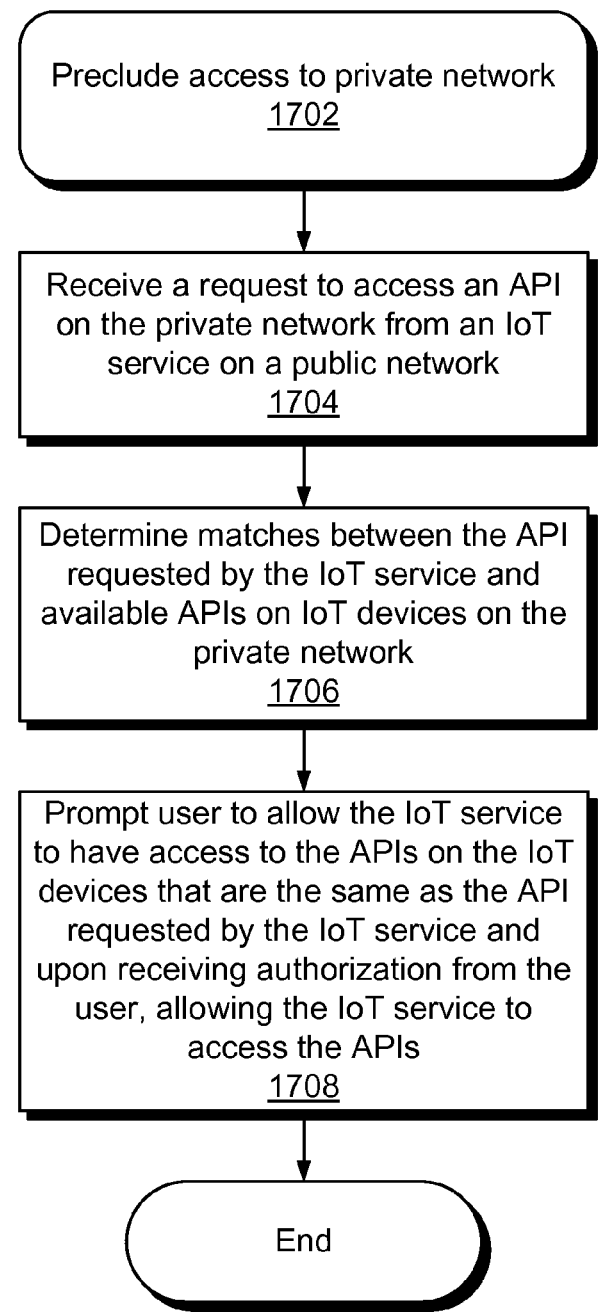
FIG. 17 illustrates a method for securing access to internet-of-things (IoT) devices on a private network.

FIG. 17 illustrates a method for securing access to internet-of-things (IoT) devices on a private network. The method 1700 can include precluding access to a private network (Block 1702) and receiving a request to access an API on the private network from an IoT service on a public network (Block 1704). In one instance, a gateway device can perform the precluding. The IoT service can reside on the gateway device. The method 1700 can also include determining matches between the API requested by the IoT service and available APIs on IoT devices on the private network (Block 1706). The method 1700 can yet further include prompting a user to allow the IoT service to have access to the APIs on the IoT devices that are the same as the API requested by the IoT service and upon receiving authorization from the user, allowing the IoT service to access the APIs (Block 1708).

Figure 18:
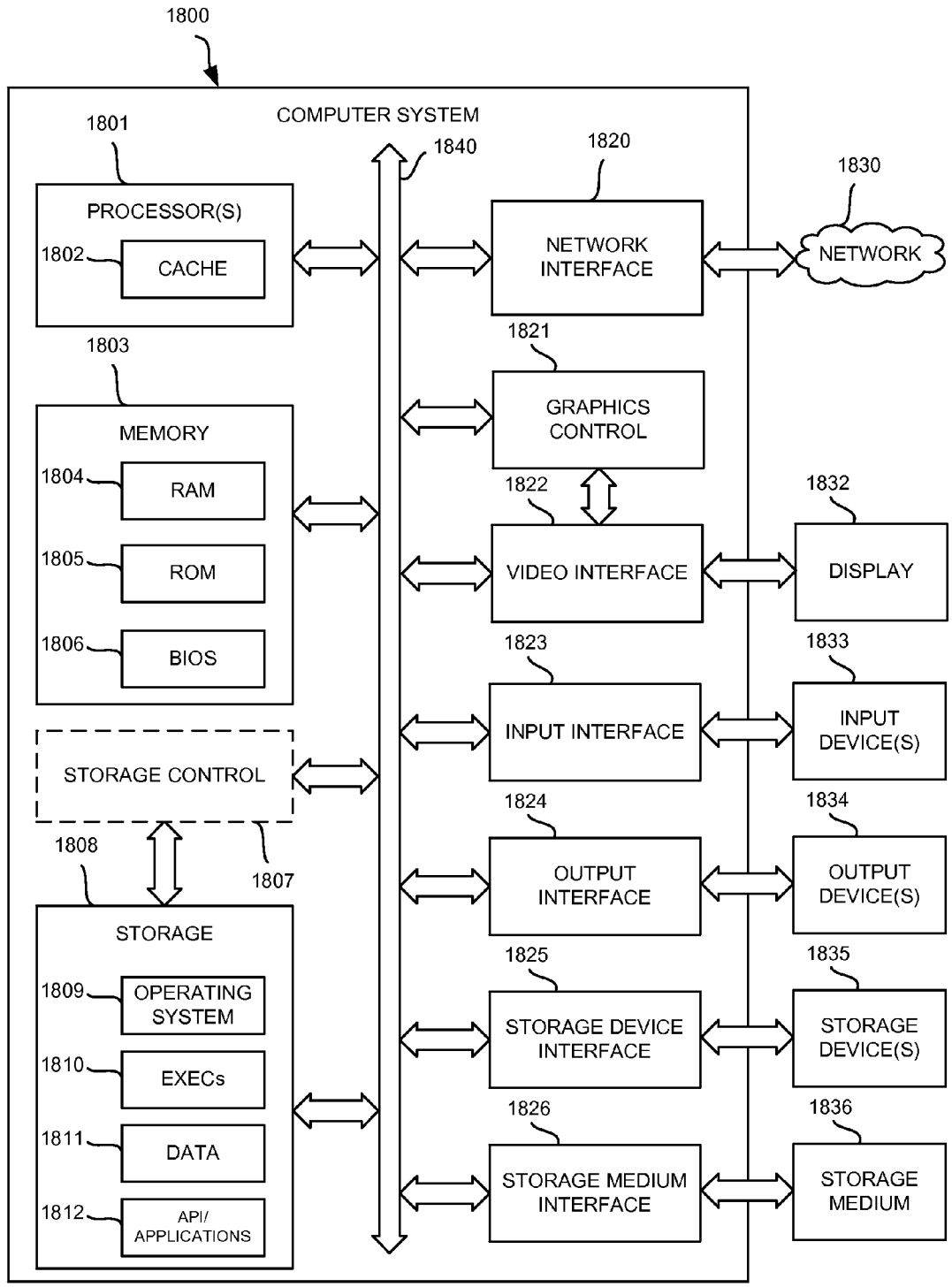
FIG. 18 shows a diagrammatic representation of one embodiment of a computer system.

The systems and methods described herein can be implemented in a computer system in addition to the specific physical devices described herein. FIG. 18 shows a diagrammatic representation of one embodiment of a computer system 1800 within which a set of instructions can execute for causing a device to perform or execute any one or more of the aspects and/or methodologies of the present disclosure. The gateway device 960 in FIG. 9 is one implementation of the computer system 1800. The components in FIG. 18 are examples only and do not limit the scope of use or functionality of any hardware, software, firmware, embedded logic component, or a combination of two or more such components implementing particular embodiments of this disclosure. Some or all of the illustrated components can be part of the computer system 1800. For instance, the computer system 1800 can be a general purpose computer (e.g., a laptop computer) or an embedded logic device (e.g., an FPGA), to name just two non-limiting examples.

Computer system 1800 includes at least a processor 1801 such as a central processing unit (CPU) or an FPGA to name two non-limiting examples. The gateway device 960 may include an implementation of the processor 1801 to carry out the functions of the gateway device 960 as described herein. The computer system 1800 may also comprise a memory 1803 and a storage 1808, both communicating with each other, and with other components, via a bus 1840. The bus 1840 may also link a display 1832, one or more input devices 1833 (which may, for example, include a keypad, a keyboard, a mouse, a stylus, etc.), one or more output devices 1834, one or more storage devices 1835, and various non-transitory, tangible computer-readable storage media 1836 with each other and with one or more of the processor 1801, the memory 1803, and the storage 1808. All of these elements may interface directly or via one or more interfaces or adaptors to the bus 1840. For instance, the various non-transitory, tangible computer-readable storage media 1836 can interface with the bus 1840 via storage medium interface 1826. Computer system 1800 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1801 (or central processing unit(s) (CPU(s))) optionally contains a cache memory unit 1802 for temporary local storage of instructions, data, or computer addresses. Processor(s) 1801 are configured to assist in execution of computer-readable instructions stored on at least one non-transitory, tangible computer-readable storage medium. Computer system 1800 may provide functionality as a result of the processor(s) 1801 executing software embodied in one or more non-transitory, tangible computer-readable storage media, such as memory 1803, storage 1808, storage devices 1835, and/or storage medium 1836 (e.g., read only memory (ROM)). For instance, the methods 1500, 1600, and 1700 in FIGS. 15-17 may be embodied in one or more non-transitory, tangible computer-readable storage media. The non-transitory, tangible computer-readable storage media may store software that implements particular embodiments, such as the methods 1500, 1600, and 1700, and processor(s) 1801 may execute the software. Memory 1803 may read the software from one or more other non-transitory, tangible computer-readable storage media (such as mass storage device(s) 1835, 1836) or from one or more other sources through a suitable interface, such as network interface 1820. The gateway device 960 may include an implementation of the network interface 1820 to communicate via the public network 903 and the private network 901. The software may cause processor(s) 1801 to carry out one or more processes or one or more steps of one or more processes described or illustrated herein. Carrying out such processes or steps may include defining data structures stored in memory 1803 and modifying the data structures as directed by the software. In some embodiments, an FPGA can store instructions for carrying out functionality as described in this disclosure (e.g., the methods 1500, 1600, and 1700). In other embodiments, firmware includes instructions for carrying out functionality as described in this disclosure (e.g., the methods 1500, 1600, and 1700).

The memory 1803 may include various components (e.g., non-transitory, tangible computer-readable storage media) including, but not limited to, a random access memory component (e.g., RAM 1804) (e.g., a static RAM "SRAM", a dynamic RAM "DRAM, etc.), a read-only component (e.g., ROM 1805), and any combinations thereof. ROM 1805 may act to communicate data and instructions unidirectionally to processor(s) 1801, and RAM 1804 may act to communicate data and instructions bidirectionally with processor(s) 1801. ROM 1805 and RAM 1804 may include any suitable non-transitory, tangible computer-readable storage media described below. In some instances, ROM 1805 and RAM 1804 include non-transitory, tangible computer-readable storage media for carrying out the methods 1500, 1600, and 1700. In one example, a basic input/output system 1806 (BIOS), including basic routines that help to transfer information between elements within computer system 1800, such as during start-up, may be stored in the memory 1803.

Fixed storage 1808 is connected bidirectionally to processor(s) 1801, optionally through storage control unit 1807. Fixed storage 1808 provides additional data storage capacity and may also include any suitable non-transitory, tangible computer-readable media described herein. Storage 1808 may be used to store operating system 1809, EXECs 1810 (executables), data 1811, API applications 1812 (application programs), and the like. For instance, the storage 1808 could be implemented for storage of available APIs or requested APIs, to name two non-limiting examples, as described in FIGS. 9-14. Often, although not always, storage 1808 is a secondary storage medium (such as a hard disk) that is slower than primary storage (e.g., memory 1803). Storage 1808 can also include an optical disk drive, a solid-state memory device (e.g., flash-based systems), or a combination of any of the above. Information in storage 1808 may, in appropriate cases, be incorporated as virtual memory in memory 1803.

In one example, storage device(s) 1835 may be removably interfaced with computer system 1800 (e.g., via an external port connector (not shown)) via a storage device interface 1825. Particularly, storage device(s) 1835 and an associated machine-readable medium may provide nonvolatile and/or volatile storage of machine-readable instructions, data structures, program modules, and/or other data for the computer system 1800. For instance, the storage device(s) 1835 may include one or more flash storage devices removably inserted into a mobile device and wherein data and application code is stored on the storage device(s) 1835. In another example, software may reside, completely or partially, within a machine-readable medium on storage device(s) 1835. In another example, software may reside, completely or partially, within processor(s) 1801.

Bus 1840 connects a wide variety of subsystems. Herein, reference to a bus may encompass one or more digital signal lines serving a common function, where appropriate. Bus 1840 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1800 may also include an input device 1833. In one example, a user of computer system 1800 may enter commands and/or other information into computer system 1800 via input device(s) 1833. Examples of an input device(s) 1833 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1833 may be interfaced to bus 1840 via any of a variety of input interfaces 1823 (e.g., input interface 1823) including, but not limited to, serial, parallel, game port, USB, FIREWIRE, THUNDERBOLT, or any combination of the above.

In particular embodiments, when computer system 1800 is connected to network 1830 (such as public and private networks 903 and 901 in FIG. 9), computer system 1800 may communicate with other devices, such as mobile devices and enterprise systems, connected to network 1830. Communications to and from computer system 1800 may be sent through network interface 1820. For example, network interface 1820 may receive incoming communications (such as requests or responses from other devices) in the form of one or more packets (such as Internet Protocol (IP) packets) from network 1830, and computer system 1800 may store the incoming communications in memory 1803 for processing. Computer system 1800 may similarly store outgoing communications (such as requests or responses to other devices) in the form of one or more packets in memory 1803 and communicated to network 1830 from network interface 1820. Processor(s) 1801 may access these communication packets stored in memory 1803 for processing.

Examples of the network interface 1820 include, but are not limited to, a network interface card, a modem, and any combination thereof. Examples of a network 1830 or network segment 1830 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, private network 901 is one exemplary implementation of the network 1830. A network, such as network 1830, may employ a wired and/or a wireless mode of communication. In general, any network topology may be used.

Information and data can be displayed through a display 1832. Examples of a display 1832 include, but are not limited to, a liquid crystal display (LCD), an organic liquid crystal display (OLED), a cathode ray tube (CRT), a plasma display, and any combinations thereof. The display 1832 can interface to the processor(s) 1801, memory 1803, and fixed storage 1808, as well as other devices, such as input device(s) 1833, via the bus 1840. The display 1832 is linked to the bus 1840 via a video interface 1822, and transport of data between the display 1832 and the bus 1840 can be controlled via the graphics control 1821.

In addition to a display 1832, computer system 1800 may include one or more other peripheral output devices 1834 including, but not limited to, an audio speaker, a printer, and any combinations thereof. Such peripheral output devices may be connected to the bus 1840 via an output interface 1824. Examples of an output interface 1824 include, but are not limited to, a serial port, a parallel connection, a USB port, a FIREWIRE port, a THUNDERBOLT port, and any combinations thereof.

In addition or as an alternative, computer system 1800 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein (e.g., the methods 1500, 1600, and 1700) may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Additional details that relate to the aspects and embodiments disclosed herein are described and illustrated in the Appendices attached hereto, the contents of which are expressly incorporated herein by reference in their entirety as part of this disclosure.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD- ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A system comprising:
   a hardware gateway device coupled to a public and to a private network and for precluding access from the public network to the private network;
   one or more internet-of-things (IoT) devices on the private network;
   an app download server executing a third-party app, the third-party app requesting download to the gateway device before the user is aware of the availability of the third-party app and requesting access to at least one function of an IoT device on the private network regardless as to the IoT device on which the function operates;
   a manifest file;
   an app connectivity service configured to:
      record the at least one function requested by the third-party app to the manifest file;
      identify available application programming interfaces (APIs) on the one or more IoT devices that provide the at least one function requested by the third-party app by receiving announce messages from IoT devices having the available APIs, wherein the IoT devices send the announce messages in response to polling from the app connectivity service;
      record in the manifest file a mapping between those of the available APIs that provide the at least one function requested by the third-party app, one or more IoT devices hosting those of the available APIs, and the third-party app;
      prompt a user to allow the third-party app to have access to the available APIs that provide the at least one function requested by the third-party app; and
      upon receiving authorization from the user, download and install the third-party app on the gateway device and allow the third-party app to access the available APIs on the one or more IoT devices authorized by the user;
      for a second third-party app that also requests access to a requested function, if authorization from the user is not received, then precluding download and install of the second third-party app;
      prompt the user to allow the third-party app to have access to a new API that becomes available on a new IoT device that joins the private network, or that becomes available on one of the existing one or more IoT devices.

2. The system of claim 1, wherein the app connectivity service is further configured to prompt the user to allow the third-party app to have access to a specific IoT device when more than one IoT device provides one of the available APIs that provides the at least one function requested by the third-party app.

3. The system of claim 1, wherein the app connectivity service is further configured to receive authorization from the user to download and install the third-party app on the gateway device and allow the third-party app to access the available APIs on the one or more IoT devices authorized by the user for a user-selected period of time.

4. The system of claim 3, wherein the authorization includes one or more recurring, but limited, periods of time each day.

5. The system of claim 1, wherein the authorization is revoked after download and install of the third-party app.

6. The system of claim 1, wherein the app connectivity service is further configured to download and install the third-party application on a generic IoT device without an Internet connection by downloading and installing the third-party application via a peer-to-peer network comprising the IoT devices and the generic IoT device.

7. A method of controlling access to internet-of-things (IoT) devices selectively isolated from a public network by a gateway device, the method comprising:
   compiling, by a hardware gateway device, a list of available application programming interfaces (APIs) on IoT devices that are on a private network;
   receiving a request from a third-party app to access a requested function regardless of a device type supporting the function;
   identifying matches between the requested function and the available APIs in the list of available APIs that provide the requested function;
   prompting a user to allow the third-party app to access the available APIs that provide the requested function;

upon receiving authorization from the user, downloading and installing the third-party app on a device having access to the private network; and enabling the third-party app, once installed, to have access to those ones of the available APIs authorized by the user;

prompting the user, by an application connectivity service, to allow the third-party app to access an API that becomes available on an IoT device, the IoT device being already on the private network when the API becomes available;

wherein, for a second third-party app that also requests access to a requested function, if authorization from the user is not received, then precluding download and install of the second third-party app.

8. The method of claim 7, wherein the device on which the third-party app is installed is a gateway device for isolating the private network from the public network.

9. The method of claim 7, wherein the device on which the third-party app is installed is a user device distinct from a gateway device, the gateway device for isolating the private network from the public network.

10. The method of claim 7, wherein the device on which the third-party app is installed is one of the IoT devices.

11. A system for controlling access to interment-of things (IoT) devices selectively isolated from a public network by a gateway device, the system comprising:

means for compiling a list of available application programming interfaces (APIs) on IoT devices that are on a private network;

means for receiving a request from a third-party app to access a requested function regardless of an IoT device on the private network having the requested function;

means for identifying matches between the requested function and the available APIs in the list of available APIs that provide the requested function;

means for prompting a user to allow the third-party app to access the available APIs that provide the requested function;

means for upon receiving authorization from the user, downloading and installing the third-party app on a device having access to the private network;

means for enabling the third-party app, once installed, to have access to those ones of the available APIs authorized by the user;

means for prompting the user to allow the third-party app to access an API that becomes available on an IoT device, the IoT device being already on the private network when the API becomes available;

wherein, for a second third-party app that also requests access to a requested function, if authorization from the user is not received, then precluding download and install of the second third-party app.

12. The system of claim 11, wherein the device on which the third-party app is installed is a gateway device for isolating the private network from the public network.

13. The system of claim 11, wherein the device on which the third-party app is installed is a user device distinct from a gateway device, the gateway device for isolating the private network from the public network.

14. The system of claim 11, wherein the device on which the third-party app is installed is one of the IoT devices.

* * * * *